(12) United States Patent
Aramoto et al.

(10) Patent No.: US 11,317,271 B2
(45) Date of Patent: *Apr. 26, 2022

(54) MOBILE STATION, POSITION MANAGEMENT APPARATUS, SUBSCRIBER INFORMATION MANAGEMENT APPARATUS, MOBILE COMMUNICATION SYSTEM, ACCESS CONTROL APPARATUS, HOME BASE STATION AND COMMUNICATION METHOD

(71) Applicant: Sharp Kabushiki Kaisha, Sakai (JP)

(72) Inventors: Masafumi Aramoto, Sakai (JP); Hirokazu Naoe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 361 days.

This patent is subject to a terminal disclaimer.

(21) Appl. No.: 15/834,362

(22) Filed: Dec. 7, 2017

(65) Prior Publication Data

US 2018/0103366 A1  Apr. 12, 2018

Related U.S. Application Data

(63) Continuation of application No. 13/380,345, filed as application No. PCT/JP2010/060449 on Jun. 21, 2010, now Pat. No. 9,867,030.

(30) Foreign Application Priority Data

Jun. 23, 2009  (JP) ................................ 2009-148917

(51) Int. Cl.
*H04W 8/02* (2009.01)
*H04W 8/20* (2009.01)
(Continued)

(52) U.S. Cl.
CPC ............... *H04W 8/02* (2013.01); *H04W 8/20* (2013.01); *H04W 12/088* (2021.01); *H04W 84/105* (2013.01)

(58) Field of Classification Search
CPC ......... H04W 8/02; H04W 8/20; H04W 12/08; H04W 84/105
See application file for complete search history.

(56) References Cited

U.S. PATENT DOCUMENTS 7,761,913 B2 * 7/2010 Grandmaitre ......... H04W 12/06 726/12
8,041,335 B2 * 10/2011 Khetawat .............. H04L 63/104 455/404.2

(Continued)

FOREIGN PATENT DOCUMENTS

EP    2 157 812 A1   2/2010
JP    6-245255 A     9/1994
(Continued)

OTHER PUBLICATIONS

3GPP TR 23.830 V0.5.0 (May 2009), "Architecture aspects of Home NodeB and Home eNodeB."

(Continued)

*Primary Examiner* — Asad M Nawaz
*Assistant Examiner* — Kai Chang
(74) *Attorney, Agent, or Firm* — Birch, Stewart, Kolasch & Birch, LLP

(57) ABSTRACT

A system includes a subscription storage that stores an APN for identifying a home base station and the service class available for a UE as subscription information, in correspondence with a mobile terminal identifier for identifying UE; a positional information update request receiver for receiving a positional information update request of UE 70 from an MME; and a positional information response transmitter that extracts the available service class included in the (Continued)

positional information update request, from the subscription storage and transmits a positional information update response included with the extracted service class to MME. With this configuration, it is possible to provide a mobile communication system in which, for a plurality of services of a home base station, the owner of a home base station can set the access right for each of the services, and communication data is transferred based on the set access right.

10 Claims, 20 Drawing Sheets

(51) Int. Cl.
*H04W 12/088* (2021.01)
*H04W 84/10* (2009.01)

(56) References Cited

U.S. PATENT DOCUMENTS

| | | | |
|---|---|---|---|
| 8,072,953 B2 | 12/2011 | Mukherjee et al. | |
| 8,462,770 B2* | 6/2013 | Kant | H04L 45/304 370/352 |
| 8,467,782 B1 | 6/2013 | Faccin | |
| 8,755,352 B2 | 6/2014 | Rommer et al. | |
| 2005/0122942 A1* | 6/2005 | Rhee | H04W 28/08 370/338 |
| 2006/0133319 A1* | 6/2006 | Kant | H04L 63/10 370/331 |
| 2006/0168655 A1* | 7/2006 | Grandmaitre | H04L 63/08 726/12 |
| 2007/0271598 A1* | 11/2007 | Chen | H04L 63/08 726/4 |
| 2008/0240037 A1 | 10/2008 | Bedekar et al. | |
| 2008/0254833 A1 | 10/2008 | Keevill et al. | |
| 2008/0267153 A1 | 10/2008 | Mukherjee et al. | |
| 2008/0285492 A1* | 11/2008 | Vesterinen | H04W 76/12 370/310 |
| 2009/0040964 A1 | 2/2009 | Zhao et al. | |
| 2009/0163205 A1* | 6/2009 | Farber | H04W 60/04 455/435.1 |
| 2010/0020779 A1 | 1/2010 | Kalhan et al. | |
| 2010/0027533 A1* | 2/2010 | Kant | H04L 45/00 370/355 |
| 2010/0120461 A1 | 5/2010 | Mori | |
| 2010/0195493 A1 | 8/2010 | Hedman et al. | |
| 2010/0195621 A1 | 8/2010 | Kekki et al. | |
| 2010/0272013 A1* | 10/2010 | Horn | H04W 76/12 370/328 |
| 2010/0278108 A1 | 11/2010 | Cho et al. | |
| 2010/0284299 A1* | 11/2010 | Bi | H04W 48/16 370/253 |
| 2010/0284386 A1 | 11/2010 | Ulupinar et al. | |
| 2011/0182227 A1* | 7/2011 | Rune | H04W 8/082 370/312 |
| 2012/0039304 A1 | 2/2012 | Kim et al. | |
| 2012/0069763 A1 | 3/2012 | Zhao et al. | |
| 2012/0083273 A1 | 4/2012 | Mukherjee et al. | |
| 2013/0322240 A1* | 12/2013 | Deng | H04W 76/10 370/230 |
| 2014/0199962 A1* | 7/2014 | Mohammed | H04M 15/70 455/406 |

FOREIGN PATENT DOCUMENTS

| | | |
|---|---|---|
| WO | WO 2007/110584 A1 | 10/2007 |
| WO | WO 2008/134281 A2 | 11/2008 |
| WO | WO 2008/136422 A1 | 11/2008 |

OTHER PUBLICATIONS

3GPP TS 22.220 v1.2.0 (Feb. 2009), S1-090343, 3GPP, Feb. 2009, "5.3.2 Closed Subscriber Group", "5.9 Local IP Access to the Internet".
3GPP TS 22.220 V1.2.0 (Feb. 2009) Service Requirements for Home NodeBs and Home eNodeBs (Release 9), "5.7 Local IP access in the home based network," 4 pages.
3GPP TS 22.220 V1.2.0 (Feb. 2009) Service Requirements for Home NodeBs and Home eNodeBs (Release 9), "5.8 Managed Remote Access to home based network," 3 pages.
3GPP TS 22.220 V9.1.0 (Jun. 2009), "Service Requirements for Home NodeBs and Home eNodeBs."
3GPP TS 23.401 V8.6.0 (Jun. 2009), "General Packet Radio Service (GPRS) enhancements for Evolved Universal Terrestrial Radio Access Network (E-UTRAN) access."
3GPP TSG-SA2 Meeting #73, S2-093803, "Local IP access principles for single PDN connection solutions."
English Translation of International Preliminary Report on Patentability issued in International Application No. PCT/JP2010/060449 dated Jan. 26, 2012.
Qualcomm Europe, "Local IP access baseline solution for EHNB", 3GPP TSG SA WG2 Meeting #72, Mar. 30-Apr. 3, 2009, Hangzhou, China, TD S2-092308, 6 pages.
Notice of Allowance issued in the copending U.S. Appl. No. 13/380,345, dated Sep. 1, 2017.
Office Action issued in the copending U.S. Appl. No. 13/380,345, dated Dec. 26, 2014.
Office Action issued in the copending U.S. Appl. No. 13/380,345, dated Jul. 23, 2015.
Office Action issued in the copending U.S. Appl. No. 13/380,345, dated May 18, 2016.

* cited by examiner

| UE's IP Address Prefix | Transmission Path |
|---|---|
| UE1_HNP1 | PMIP Tunnel 1 |

FIG. 6

| UE Identifier | CSG Identifier | APN | Available Service | |
|---|---|---|---|---|
| | | | Class 1 Internet Connection | Class 2 Home Network Connection |
| UE1 | CSGID1 | BOB'S_HOME | Disallowed | Allowed |
| | CSGID2 | ALICE'S_HOME | Allowed | Disallowed |
| UE2 | CSGID1 | BOB'S_HOME | Allowed | Disallowed |

FIG. 7

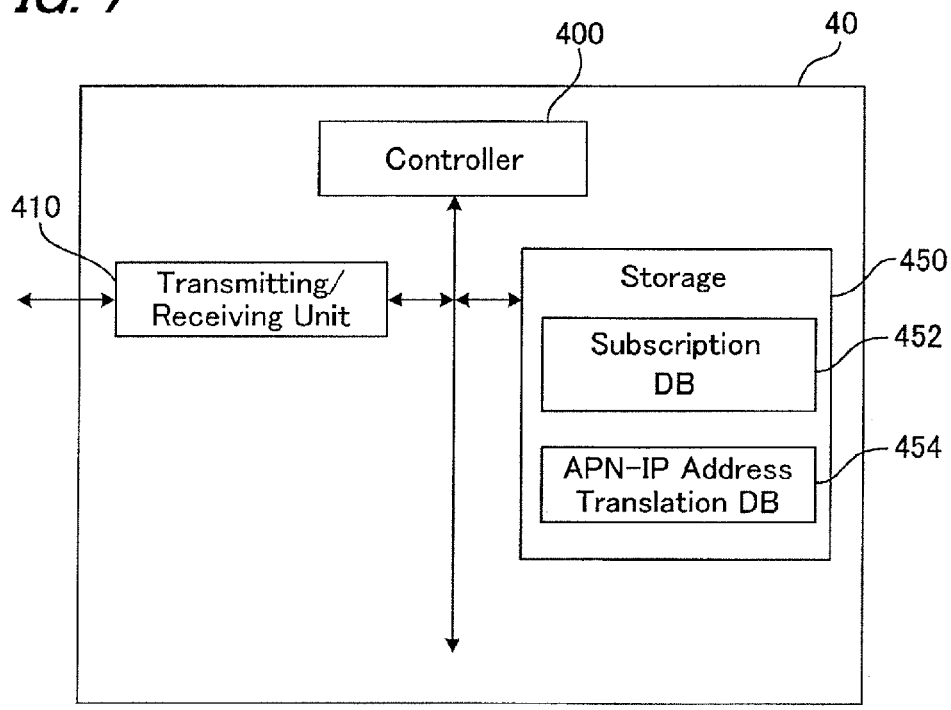

FIG. 8

| UE Identifier | CSG Identifier | APN | Available Service | |
|---|---|---|---|---|
| | | | Class 1 Internet Connection | Class 2 Home Network Connection |
| UE1 | CSGID1 | BOB'S_HOME | Disallowed | Allowed |
| | CSGID2 | ALICE'S_HOME | Allowed | Disallowed |

| APN | PGW IP Address | SGW IP Address |
|---|---|---|
| WEB | 2001:200:1: :1 | 2001:200:2: :1 |

| UE's IP Address Prefix | Transmission Path |
|---|---|
| UE1_HNP2 | PMIP Tunnel 2 |

| Service Class | Filtering Rule |
|---|---|
| Class 1<br>Internet Connection | 1. allow all<br>2. disallow IPv6=2001:100:200:3000: :/64 |
| Class 2<br>Home Network Connection | 1. disallow all<br>2. allow IPv6=2001:100:200:3000: :/64 |
| Class 3<br>Internet Connection and<br>Home Network Connection | 1. allow all |

| APN List | |
|---|---|
| 1. | WEB |
| 2. | BOB'S_HOME(CSGID1) |

FIG. 19

| APN | PGW IP Address | SGW IP Address |
|---|---|---|
| WEB | 2001:200:1: :1 | 2001:200:2: :1 |
| BOB'S_HOME | 2001:100:200:3000: :3 | 2001:100:200:3000: :3 |

| UE Identifier | Available Service | |
|---|---|---|
| | Class 1 Internet Connection | Class 2 Home Network Connection |
| UE1 | Disallowed | Allowed |
| UE2 | Allowed | Disallowed |

MOBILE STATION, POSITION MANAGEMENT APPARATUS, SUBSCRIBER INFORMATION MANAGEMENT APPARATUS, MOBILE COMMUNICATION SYSTEM, ACCESS CONTROL APPARATUS, HOME BASE STATION AND COMMUNICATION METHOD

CROSS-REFERENCE TO RELATED APPLICATION

This application is a Continuation of copending application Ser. No. 13/380,345, filed on Dec. 22, 2011, which was filed as PCT International Application No. PCT/JP2010/060449 on Jun. 21, 2010, Patent Application No. 2009-148917, filed in Japan on Jun. 23, 2009, all of which are hereby expressly incorporated by reference into the present application.

TECHNICAL FIELD

The present invention relates to a mobile communication system and the like.

BACKGROUND ART

Mobile communication system standardization group, 3GPP (The 3rd Generation Partnership Project) is investigating EPS (Evolved Packet System) as a next generation mobile telecommunication system, and studying HeNB (Home eNodeB) as a small base station installed in a residence or the like as an EPS configurational apparatus (which will be referred to hereinbelow as home base station).

The home base station forms a small-scale wireless cell called a femtocell, which accommodates UEs (User Equipment: mobile terminal devices) using the same wireless access technique as that of a normal base station and establishes connection to the core network of the mobile communication system via a broadband line to be able to relay communication data of UEs accommodated therein.

Since the home base station uses the broadband line as backhaul and can be set by a general user, it is possible to easily extend the coverage area of the mobile communication system, especially the indoor coverage area. Further, since the radius of the cell is small and the cell can be exclusively used by a few users, it is possible to expect improvement in communication speed and frequency usage efficiency compared to an outdoor macro cell base station which a large number of users have to share.

Further, in non-patent document 2, local IP access function is defined as a functional requirement of a home base station. The local IP access is to provide for UEs connectivity to the network such as a network inside the home (which will be referred to hereinbelow as "home network") to which the home base station is connected directly. For example, this enables a UE to connect another information terminal (printer etc.) that is connected to the home network (this will be called hereinbelow "home network connection service"), and also enables the UE to connect to the internet without passage of the core network of the mobile communication system (this will be called hereinbelow "internet connection service").

Conventionally, if a UE performs direct communication with an appliance having no cellular communication interface such as a printer or the like, the UE needs to have a local area-use communication interface such as a wireless LAN etc. However, use of local IP access enables even a UE that has a cellular communication interface only to perform communication with other communication terminals within the home network because the home base station functions as a gateway between different wireless access schemes.

Since use of local IP access also makes it possible to connect to the internet without passage of the core network of the mobile communication system, it is possible to distribute traffic load (offload), from the perspective of the mobile network operator.

Further, differing from a microcell base station, the home base station can give access right only to a particular UE based on the form of the usage, and three access modes called closed, open and hybrid are defined. Each home station is allotted with a group identifier called CSGID (Closed Subscriber Group Identification). In the closed mode, the home base station can designate UEs to be permitted to connect for every CSGID. In the open mode, the home base station can give the right of access to the home base station to all UEs. In the hybrid mode, which is a combination of the closed mode and open mode, communication of UEs that are given with access right in closed mode can be handled preferentially.

Further, concerning local IP access, it is defined as a requisite that whether or not the user is permitted to use this function should be determined based on the user's subscription information. It is also ruled as a functional requisite that a UE can use local IP access and connection to the core network simultaneously when the UE is connecting to the home base station.

Moreover, non-patent document 3 discloses architecture candidates for embodying a home base station.

PRIOR ART DOCUMENTS

Non-Patent Documents

Non-patent Document 1: 3GPP TS23.401 General Packet Radio Service (GPRS) enhancements for Evolved Universal Terrestrial Radio Access Network (E-UTRAN) access
Non-patent Document 2: 3GPP TS 22.220
Non-patent Document 3: 3GPP TS 23.830
Non-patent Document 4: 3GPP Contribution S2-092308 (Local IP access baseline solution for EHNB)

SUMMARY OF THE INVENTION

Problems to be Solved by the Invention

According to the information disclosed in non-patent document 3, access control at the home base station is determined depending on the aforementioned three access modes and the subscription information based on which whether the local IP access function is permitted to use is determined. However, if the usage scenario of the home base station is considered, it is desirable that the owner of the home base station or the mobile network operator can designate access right in more detail as describe below.

Suppose, for example, a case in which a home base station is set in a home, there is a demand that the family may offer a friend, who visits the residence, only the internet connection service through local IP access but does not want to permit the friend to use home network connection service in view of privacy and security.

Suppose another case in which a home base station is installed in a shopping mall etc., there is a demand that an advertisement distribution server for distributing advertisement information and the like is installed in the home network so as to allow visiting customers to access only the home network connection service through local IP access and so as to provide a connection with an advertisement server, but not to allow them to access internet connection service.

However, because the access control based on the aforementioned access mode and the subscription information themselves cannot offer the scheme to separately designate access right as to a plurality of services that are available through local IP access, there is the problem that the aforementioned usage scenario cannot be realized.

Further, when a UE uses local IP access, not only the communication data the UE transmits by way of the home base station but also the communication data transmitted from another information terminal connected to the home network, to the UE should be limited as to connection depending on the access right.

For example, communication from the information terminal to a UE that is not permitted to access home network connection service should be shut off, whereas if the UE in question is authorized to use internet connection service by way of local IP access, the communication data corresponding to that should be normally transferred to the UE. However, due to the above-described access right problem, it is impossible to filter these packets as it stands.

Local IP access also has a problem that there is no contrivance for notifying a UE of which services are permitted.

For example, in EPS, a PDN (Packet Data Network: packet communication network) exists for each network service such as an internet connection service or IMS service, and one APN (Access Point Name) that uniquely identifies each PDN is used to explicitly express connection to a particular PDN. It is proposed in non-patent document 4 that a network that is connected using local IP access (the internet connected via a home network and a broadband access network) is regarded as one PDN (Packet Data Network: packet communication network) and a dedicated APN is allotted for local IP access.

With this scheme, a UE can separately use the APN that expresses network connection via the core network and the APN that expresses network connection using local IP access, so that the UE can make use of simultaneous connection to local IP access and the core network. Further, by integrating local IP access as a single PDN, it is also possible to integrate the management information (the IP address, various kinds of setup information, etc. set for each PDN) of a UE.

However, an APN is a mere character string. Accordingly, even if a UE acquires an APN for local IP access, this means that identifying information is merely provided to use local IP access, it is hence impossible to determine specific service to be available (whether internet connection service is available or not, and the like).

Accordingly, the UE which wants to use internet connection service will choose either establishing connection via the core network or trying to establish connection via local IP access without any confirmation of permission to internet connection. If the former is selected, no traffic offload the mobile network operator expects will be realized.

On the other hand, when the latter is selected, there is a possibility that the UE will continue to try to establish internet connection via local IP access despite that the UE is not allowed to use internet connection service due to access right. Moreover, since the UE cannot even tell the reason of the connection unavailability, whether it is attributed to access right or whether it is attributed to a problem that is actually occurring at the other connection end, it is impossible to use such a fallback function as to automatically switch its operation from the latter to the former.

In addition, a home base station is one that is introduced as a functional extension of the existing mobile communication system, so it is desirable that the change to the current specification is minimized. Accordingly, the specific means for solving the above problems also has to be realized by providing the minimum functional extension to the EPS ruled by the non-patent document 1.

The present invention has been devised in view of the above circumstances, it is therefore an object of the present invention to provide a mobile communication system and the like in which, for a plurality of services provided through local IP access functionality of a home base station, the owner of a home base station or the mobile network operator can designate the access right for each service, and the home base station to which communication data is transferred based on the designated access right and a mobile terminal based on the designated access right can select a communication path.

Means for Solving the Problems

In view of the above problems, a mobile communication system of the present invention is a mobile communication system in which a home network having a home base station to which a mobile terminal is connected and a core network to which a subscriber information management apparatus, a position management apparatus and an access control apparatus are connected, are connected via a foreign network, characterized in that the subscriber information management apparatus includes: a subscription storage that stores, as subscription information, an APN (Access Point Name) for identifying a home base station and a service class available for the mobile terminal, in correspondence with a mobile terminal identifier for identifying the mobile terminal; a positional information update request receiver for receiving a positional information update request of the mobile terminal from the position management apparatus; and, a positional information response transmitter that extracts a service class corresponding to a mobile terminal identifier included in the positional information update request, from the subscription storage and transmits a positional information update response included with the extracted service class to the position management apparatus.

A subscriber information management apparatus of the present invention is a subscriber information management apparatus included in a mobile communication system in which a home network having a home base station to which a mobile terminal is connected and a core network to which the subscriber information management apparatus, a position management apparatus and an access control apparatus are connected, are connected via an external network, comprising: a subscription storage that stores, as subscription information, an APN (Access Point Name) for identifying a home base station and a service class available for a mobile terminal via a home base station, in correspondence with a mobile terminal identifier for identifying the mobile terminal; a positional information update request receiver for receiving a positional information update request of the mobile terminal from a position management apparatus; and, a positional information response transmitter that extracts a service class corresponding to a mobile terminal identifier included in the positional information update request, from the subscription storage and transmits a positional information update response included with the extracted service class to the position management apparatus.

The subscriber information management apparatus of the present invention is characterized in that the service class available for the mobile terminal, included in the subscription information shows whether or not the mobile terminal is allowed to connect to an internet and whether or not the mobile terminal is allowed to connect to the home network.

A position management apparatus of the present invention is a position management apparatus included in a mobile communication system in which a home network having a home base station to which a mobile terminal is connected and a core network to which a subscriber information management apparatus, the position management apparatus and an access control apparatus are connected, are connected via a foreign network, comprising: an attach request receiver for receiving an attach request including a mobile terminal identifier from a mobile terminal; a positional information update request transmitter that extracts a mobile terminal identifier from the attach request and transmits a positional information update request including the mobile terminal identifier, to a subscriber information management apparatus; a positional information update response receiver for receiving a positional information update response including a service class available for the mobile terminal, from the subscriber information management apparatus; and an attach request allow/disallow decider that extracts th service class from the positional information update response and decides whether or not an attach request from the mobile terminal is acceptable, based on the available service.

A home base station of the present invention is a home base station included in a mobile communication system in which a home network having a home base station to which a mobile terminal is connected and a core network to which a subscriber information management apparatus, a position management apparatus and an access control apparatus are connected, are connected via a foreign network, comprising: a bearer setup request receiver for receiving a bearer setup request including a class of service, from a position management apparatus; a packet filtering information storage for storing packet filtering information in accordance with the service class in order to control communication of a mobile terminal; and, a packet filtering controller that performs packet filtering control on the mobile terminal to be connected, based on the service class included in the bearer setup request and the packet filtering information.

A mobile terminal of the present invention is a mobile terminal included in a mobile communication system in which a home network having a home base station to which the mobile terminal is connected and a core network to which a subscriber information management apparatus, a position management apparatus and an access control apparatus are connected, are connected via a foreign network, the home base station including an access control apparatus used for local IP access, comprising: a service class receiver for receiving a service class, from a home base station; and, a selector that selects either use of an access control apparatus connected to a core network or use of an access control apparatus used for local IP access included in a home base station, as an access control apparatus for assuring a communication path for the mobile terminal, based on the service class.

The mobile terminal of the present invention is characterized in that the service class receiver receives PCO (Protocol Configuration Option) transmitted from the home base station and extracts the service class included in the PCO.

Advantage of the Invention

According to the present invention, when a mobile terminal uses service using local IP access functionality of a home base station, the owner of the home base station or the mobile network operator can perform access control separately for each service while minimizing the modification of the existing system.

BRIEF DESCRIPTION OF THE DRAWINGS

FIG. 6 is a chart showing one example of a subscription DB of an HSS in the first embodiment.

FIG. 7 is a block diagram of an MME in the first embodiment.

FIG. 8 is a chart showing one example of a subscription DB of an MME in the first embodiment.

FIG. 19 is a chart showing one example of an APN-IP address translation DB of an MME in the first embodiment.

MODES FOR CARRYING OUT THE INVENTION

Next, the best mode for carrying out the present invention will be described with reference to the drawings. In the embodied modes, the embodiment of a mobile communication system to which the present invention is applied will be detailed as an example with reference to the drawings.

1. The First Embodiment

To begin with this, the first embodiment of a mobile communication system to which the present invention is applied will be described with reference to the drawings.

[1.1 Outline of Mobile Communication System]

Figure 1:
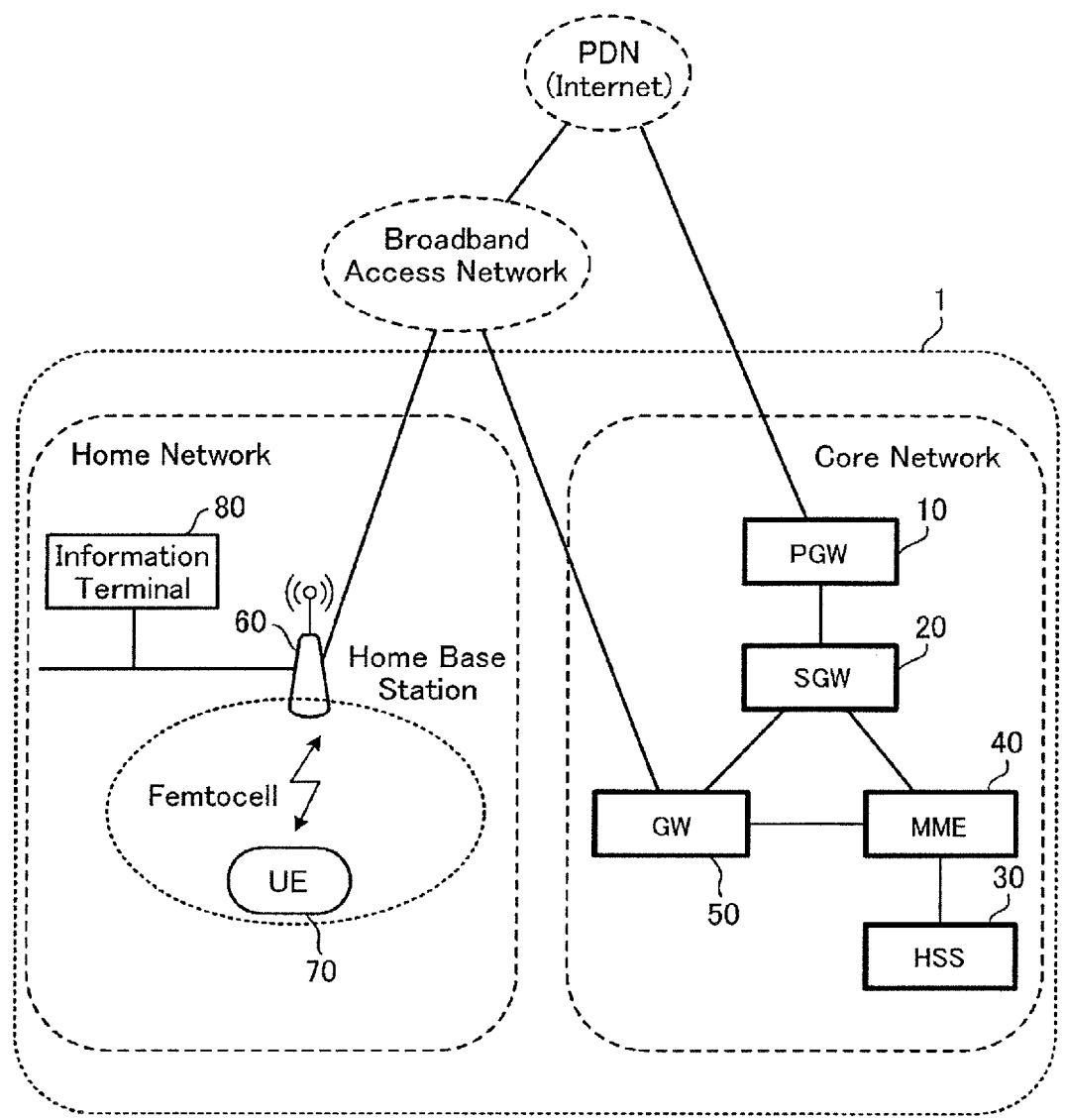
FIG. 1 is a schematic diagram showing a mobile communication system in the first embodiment.

FIG. 1 is a diagram for illustrating the outline of a mobile communication system 1 in the present embodiment. As shown in this figure, mobile communication system 1 is composed of a core network and a home network, the core network and the home network being mutually connected via a broadband access network. The broadband access network is a wired access network for realizing broadband communication, and is constructed by, for example ADSL, optical fibers and the like. However, not limited to this, the broadband access network may be a wireless access network such as WiMAX or the like.

The core network includes a PGW 10 (Packet data GW), a SGW 20 (Serving GW), an HSS 30 (Home Subscriber Service), an MME 40 (Mobility Management Entity) and GW 50.

PGW 10 is an access control apparatus which is connected to foreign PDNs (Packet Data Network: packet communication network) such as the internet and the like, functions as a gateway for connecting the core network with those PDNs and transfers communication data of a UE 70 to SGW 20.

SGW 20 is a service control apparatus that is connected to GW 50 to transfer packets between PGW 10 and home base station 60. Here, it should be noted that PGW 10 and SGW 20 may be physically configured as an identical node.

MME 40 is an entity for performing signaling and is a position management apparatus for leading position management of UE 70 and an EPS bearer establishment process. The EPS bearer is a logical path that is established between home base station 60 and SGW 20 for every UE to transfer user IP packets. Here, UE 70 is able to establish a plurality of EPS bearers.

GW 50 functions as a gateway between home base station 60 installed inside the home network and the apparatuses inside the core network.

HSS 30 is a subscriber information management apparatus that manages subscription data (subscriber information) and performs user authentication and the like to notify MME 40 of the subscription data of UE 70. The subscription data includes subscriber's service subscription information, the list of CSGIDs that are allowed to access, and others.

The home network is composed including UE 70, information terminal 80 and home base station 60. The home network is mutually connected to foreign PDNs via broadband access network.

Home base station 60 is an apparatus that forms a femtocell and accommodates UE 70 as a 3GPP LTE (Long Term Evolution) base station. Further, this also functions as a home gateway in the home network and is connected to the broadband access network.

UE 70 is a mobile communication terminal equipped with a 3GPP LTE communication interface and is connected to home network 60.

Information terminal 80 is an information terminal connected to the home network; examples including printers, network file servers, etc.

[1.2 Apparatus Configuration]

Next, the configuration of each apparatus will be briefly described using the drawings.

[1.2.1 PGW Configuration]

Figures 2, 3:
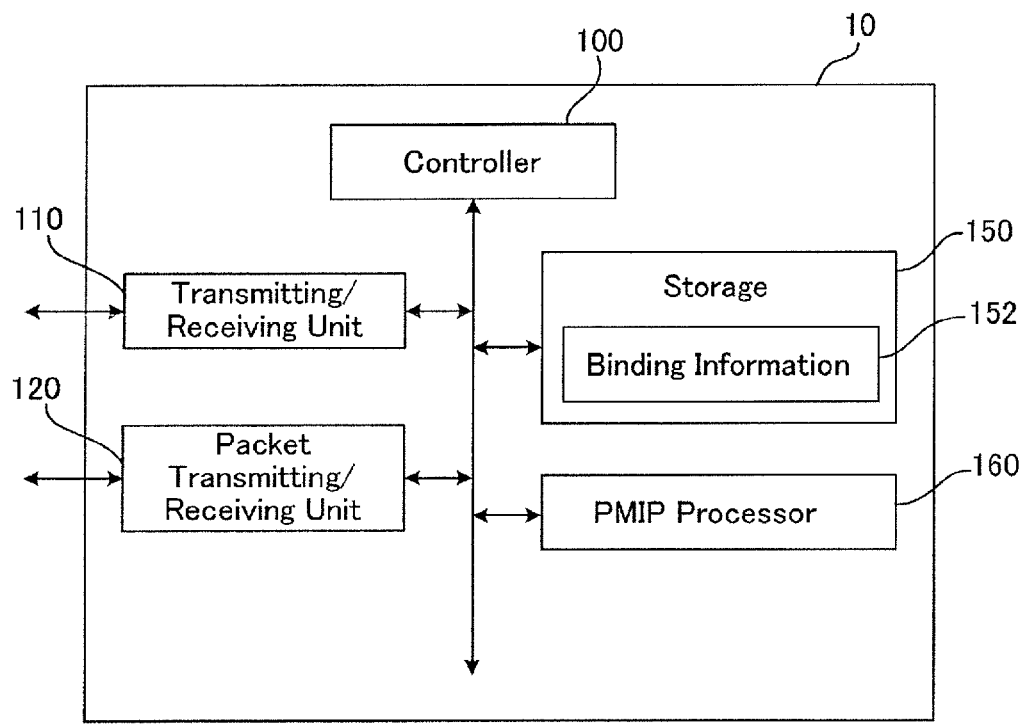
FIG. 2 is a block diagram of a PGW in the first embodiment.
FIG. 3 is a chart showing binding information of a PGW in the first embodiment.

First, the configuration of PGW 10 in the present embodiment will be described. As shown in FIG. 2, PGW 10 includes a controller 100 to which a transmitting/receiving unit 110, a packet transmitting/receiving unit 120, a storage 150 and a PMIP processor 160 are connected by a bus.

Controller 100 is a functional unit for controlling PGW 10. The controller reads out and runs various programs stored in storage 150 to thereby realize various processes.

Transmitting/receiving unit 110 is a functional unit that is wire-connected to a router or a switch to perform transmission and reception of packets. Transmission and reception of packets is performed through, for example, Ethernet (registered trademark), which is generally used as a network connecting standard, or the like.

Storage 150 is a functional unit that stores programs, data and the like necessary for various operations of PGW 10, and is configured of, for example semiconductor memory and the like. Storage 150 also stores binding information 152.

Binding information 152 is the information which PGW 10 uses when receiving communication data (packet) addressed to UE 70, to determine the transmission path for forwarding the communication data to UE 70. FIG. 3 shows one example of binding information.

As shown in FIG. 3, the IP address prefix (which will be referred to hereinbelow as "HNP(Home Network Prefix)") of UE 70 and the transmission path to SGW 20 (e.g., "PMIP tunnel 1") are recorded in a correlated manner. Here, it is assumed that each UE is allotted with a unique HNP, which is used to generate IPv6 address for UE.

Packet transmitting/receiving unit 120 is a functional unit for transmitting and receiving specific data (packets). The packet transmitting/receiving unit decomposes the data received from the superior layer into packets so as to be transmitted. The packet transceiver also realizes the function of transferring the received packets to the superior layer.

PMIP processor 160 is a functional unit for establishing a transmission path (called PMIP tunnel) used between PGW 10 and SGW 20.

[1.2.2 SGW Configuration]

Figure 4:
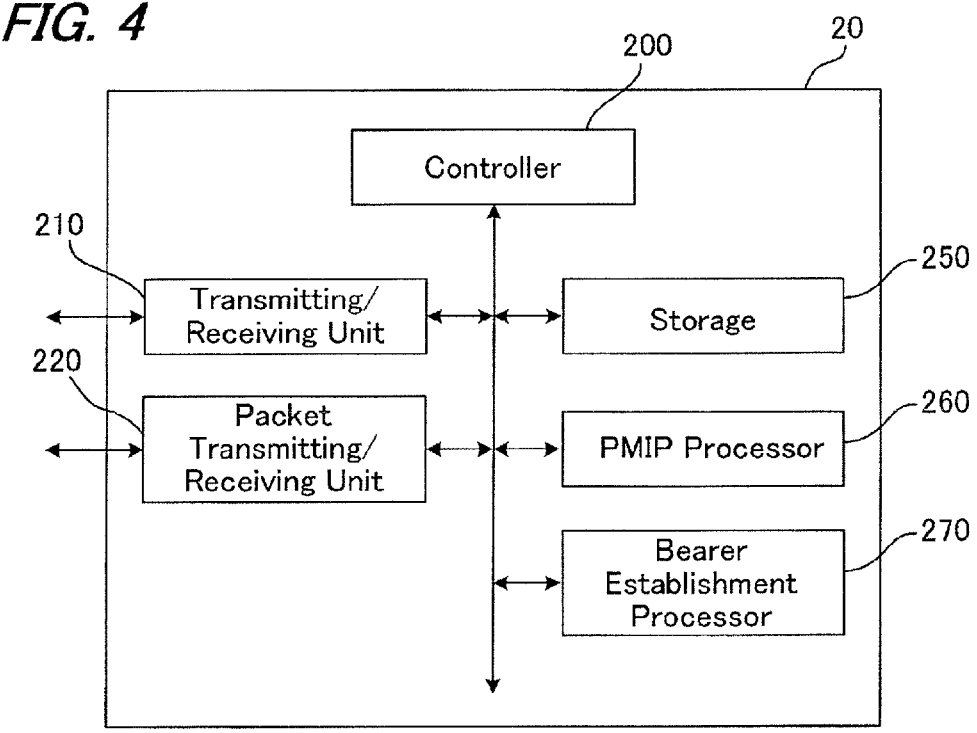
FIG. 4 is a block diagram of a SGW in the first embodiment.

Next, the configuration of SGW 20 in the present embodiment will be described. As shown in FIG. 4, SGW 20 includes a controller 200 to which a transmitting/receiving unit 210, a storage 250, a bearer establishment processor 270, a packet transmitting/receiving unit 220 and a PMIP processor 260 are connected by a bus.

Controller 200 is a functional unit for controlling SGW 20. The controller 200 reads out and runs various programs stored in storage 250 to thereby realize various processes.

Transmitting/receiving unit 210 is a functional unit that is wire-connected to a router or a switch to perform transmission and reception of packets. Transmission and reception of packets is performed through, for example, Ethernet (registered trademark), which is generally used as a network connecting standard, or the like.

Storage 250 is a functional unit that stores programs, data and the like necessary for various operations of SGW 20.

Bearer establishment processor 270 is a functional unit that implements a process for establishing an EPS bearer.

Packet transmitting/receiving unit 220 is a functional unit for transmitting and receiving specific data (packets). The packet transmitting/receiving unit decomposes the data received from the superior layer into packets so as to be transmitted. The packet transceiver also realizes the function of transferring the received packets to the superior layer.

PMIP processor 260 is a functional unit for establishing a PMIP tunnel connected in between PMIP processor 260 and PGW10.

[1.2.3 HSS Configuration]

Figure 5:
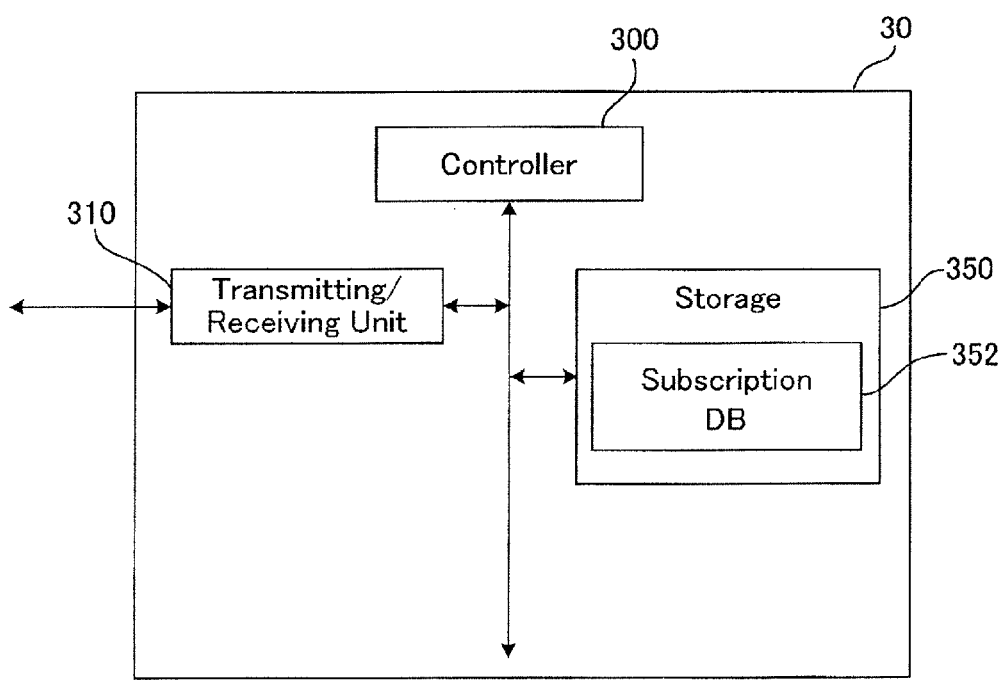
FIG. 5 is a block diagram of a HSS in the first embodiment.

Next, the configuration of HSS 30 in the present embodiment will be described. As shown in FIG. 5, HSS 30 includes a controller 300 to which a transmitting/receiving unit 310 and a storage 350 are connected by a bus.

Controller 300 is a functional unit for controlling HSS 30. The controller 300 reads out and runs various programs stored in storage 350 to thereby realize various processes.

Transmitting/receiving unit 310 is a functional unit that is wire-connected to a router or a switch to perform transmission and reception of packets. Transmission and reception of packets is performed through, for example, Ethernet (registered trademark), which is generally used as a network connecting standard, or the like.

Storage 350 is a functional unit that stores programs, data and the like necessary for various operations of HSS 30. The storage 350 further stores a subscription DB (database) 352 that holds subscriber information.

Here, FIG. 6 shows one example of subscription DB 352. Subscription DB 352 records, for UEs managed by mobile communication system 1, the UE's identifier (e.g., "UE1" generated from IMSI (International Mobile Subscriber Identify: subscriber identification information) and the like), the CSGID (e.g., "CSGID2") allotted to home base station 60 which the UE is allowed to access, the APN (e.g., "ALICE'S_HOME") for connection to the local IP access provided by the home base station 60, and either "allowed" or "disallowed", i.e., the status of the availability of service (e.g., "class 1: internet connection service" and "class 2: home network connection service") through the local IP access.

Further, it is assumed that the owner of home base station 60 or the operator of mobile communication system 1 can access subscription DB 352 and can designate and modify to which UE what kind of access right information is provided for every APN that is allotted to owned home base station 60.

Controller 300 offers information from subscription DB 352 stored in storage 350, in response to a request from MME 40.

[1.2.4 MME Configuration]

Next, the configuration of MME 40 in the present embodiment will be described. As shown in FIG. 7, MME 40 is connected with a transmitting/receiving unit 410 and a storage 450 by a bus.

Controller 400 is a functional unit for controlling MME 40. The controller 400 reads out and runs various programs stored in storage 450 to thereby realize various processes.

Transmitting/receiving unit 410 is a functional unit that is wire-connected to a router or a switch to perform transmission and reception of packets. Transmission and reception of packets is performed through, for example, Ethernet (registered trademark), which is generally used as a network connecting standard, or the like.

Storage 450 is a functional unit that stores programs, data and the like necessary for various operations of MME 40. Storage 450 is further recorded with a subscription DB 452 for temporarily storing subscriber information and an APN-IP address translation DB 454.

FIG. 8 is a chart showing one example of subscription DB 452. The structure of the database is the same as that of subscription DB 352 held by HSS 30 as shown in FIG. 6. However, information on UEs to be managed by the MME 40 only is temporarily stored.

Figures 9, 10:
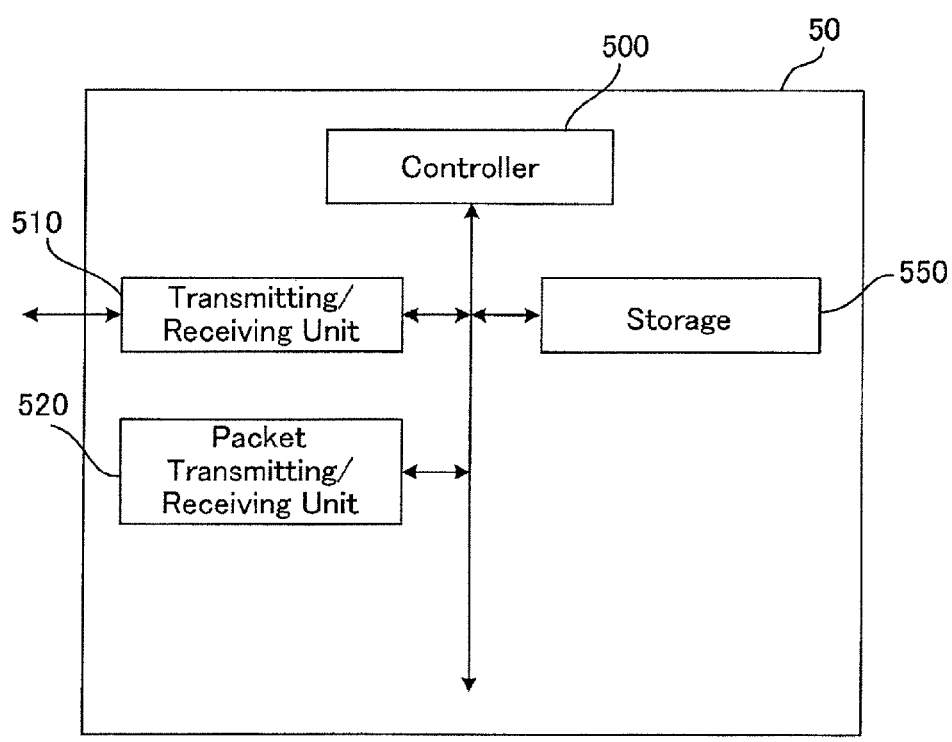
FIG. 9 is a chart showing one example of an APN-IP address translation DB of an MME in the first embodiment.
FIG. 10 is a block diagram of a GW in the first embodiment.

FIG. 9 is a chart showing one example of APN-IP address translation DB 454. As shown in FIG. 9, the database is one that holds a translation table relating an APN (e.g., "WEB") to the IP addresses of PGW 10 and SGW 20 (e.g., "2001: 200:1::1" and "2001:200:2::1). When PGW 10 and SGW 20 are given as an integrated apparatus as home base station 60, the same IP address is registered.

[1.2.5 GW Configuration]

Next, the configuration of GW 50 in the present embodiment will be described. As shown in FIG. 10, GW 50 includes a controller 500 to which a transmitting/receiving unit 510, a packet transmitting/receiving unit 520 and a storage 550 are connected by a bus.

Herein, communication between MME 40 and home base station 60 and between SGW 20 and home base station 60 is performed by way of GW 50.

Controller 500 is a functional unit for controlling GW 50. The controller 500 reads out and runs various programs stored in storage 550 to thereby realize various processes.

Transmitting/receiving unit 510 is a functional unit that is wire-connected to a router or a switch to perform transmission and reception of packets. Transmission and reception of packets is performed through, for example, Ethernet (registered trademark), which is generally used as a network connecting standard, or the like.

Packet transmitting/receiving unit 520 is a functional unit for transmitting and receiving specific data (packets). The packet transmitting/receiving unit decomposes the data received from the superior layer into packets so as to be transmitted. The packet transmitting/receiving unit also realizes the function of transferring the received packets to the superior layer. Storage 550 is a functional unit for storing programs, data and the like necessary for various operations of the GW.

[1.2.6 Home Base Station Configuration]

Figures 11, 12, 13:
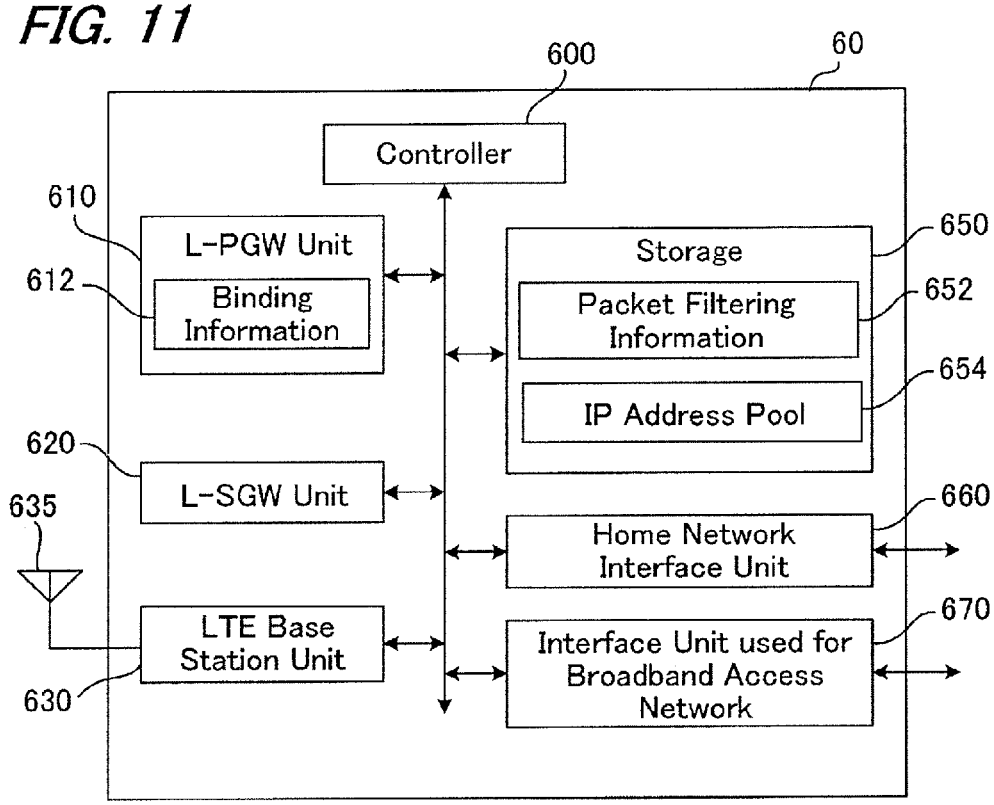
FIG. 11 is a block diagram showing a home base station in the first embodiment.
FIG. 12 is a chart showing binding information of a home base station in the first embodiment.
FIG. 13 is a chart showing one example of packet filtering information of a home base station in the first embodiment.

Next, the configuration of home base station 60 in the present embodiment will be described. FIG. 11 is a diagram for illustrating the configuration of home base station 60, and includes a controller 600, to which an L-PGW unit 610, an L-SGW unit 620, an LTE base station unit 630, a storage 650, a home network interface unit 660 and an interface unit 670 used for broadband access network are connected by a bus.

Controller 600 is a functional unit for controlling base station 60. The controller 600 reads out and runs various programs stored in storage 650 to thereby realize various processes.

L-PGW unit 610 has the same configuration as that of the above-described PGW 10, and establishes a PMIP tunnel in between L-PGW unit 610 and L-SGW unit 620. Further, the unit holds binding information 612 as shown in FIG. 12. Here, binding information 612 records the IP address prefix of UE 70 and the transmission path to L-SGW unit 620 in a correlated manner.

L-SGW unit 620 has the same configuration as that of the above-described SGW 20, and establishes a PMIP tunnel in between L-SGW unit 620 and L-PGW unit 610.

LTE base station unit 630 is a functional unit that functions as an LTE base station to accommodate UE 70. LTE base station unit 630 has an external antenna 635 connected thereto.

Storage 650 is a functional unit that stores programs, data and the like necessary for various operations of home base station 60. The storage 650 further stores packet filtering information 652 and an IP address pool 654.

FIG. 13 is a table showing one example of packet filtering information 652. This information stores the rule that determines whether packet transfer by home base station 60 is allowed or not for every offered service class (e.g., "class 1: internet connection" and the like) when home base station 60 offers local IP access functionality.

It is assumed, for example that information terminal 80 connected to the home network is allotted with an IPv6 address beginning with "2001:100:200:3000".

For a case of class 1, transfer of all packets is allowed ("allow all"), then if the destination or sender IPv6 address of a packet begins with "2001:100:200:3000", transfer of the packet is disallowed ("disallow IPv6=2001:100:200: 3000::/64"). That is, the packet filtering assigned to this class 1 is applied, so that communication from UE 70 to the home network and communication from the home network to UE 70 are shut out by home base station 60.

On the other hand, for a case of class 2, transfer of all packets is shut out ("disallow all"), then if the destination or sender IPv6 address of a packet begins with "2001:100:200: 3000", transfer of the packet is allowed ("allow IPv6=2001:100:200:3000::/64"). As a result, only the communication between UE 70 and information terminal 80 inside the home network is allowed.

Figure 14:
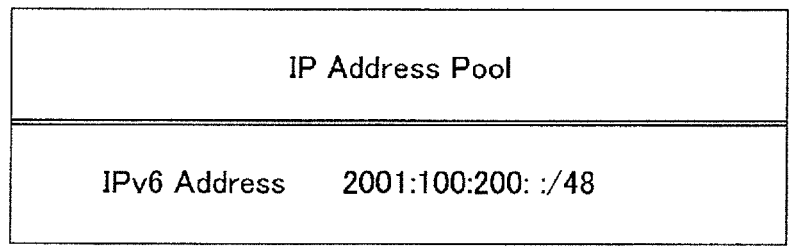
FIG. 14 is a chart showing one example of an IP address pool of a home base station in the first embodiment.

FIG. 14 is a table showing one example of IP address pool 654, and home base station 60 manages an IP address block (e.g., "2001:100:200::/48" or the like) assigned to home base station 60 by the operator offering broadband access service.

Then, it is assumed that home base station 60 gives assignment to UE 70 that uses local IP access from this IP address block, and that, for example IPv6 address prefix "2001:100:200: 4000:/64" is allotted to UE 70. Here, it is assumed that routing information has been set up on the internet so that communication addressed to IP addresses belonging to this IP address block is routed to home base station 60.

Home network interface unit 660 is a functional unit that performs transmission and reception of packets with other apparatus inside the home network. Transmission and reception is performed through, for example, Ethernet (registered trademark), which is generally used as a network connecting standard, or the like.

Interface unit 670 used for broadband access network is a functional unit that performs transmission and reception of packets with the broadband access network. Transmission and reception is performed through, for example ADSL, which is generally used as a network connecting standard, or the like.

[1.2.7 UE Configuration]

Figure 15:
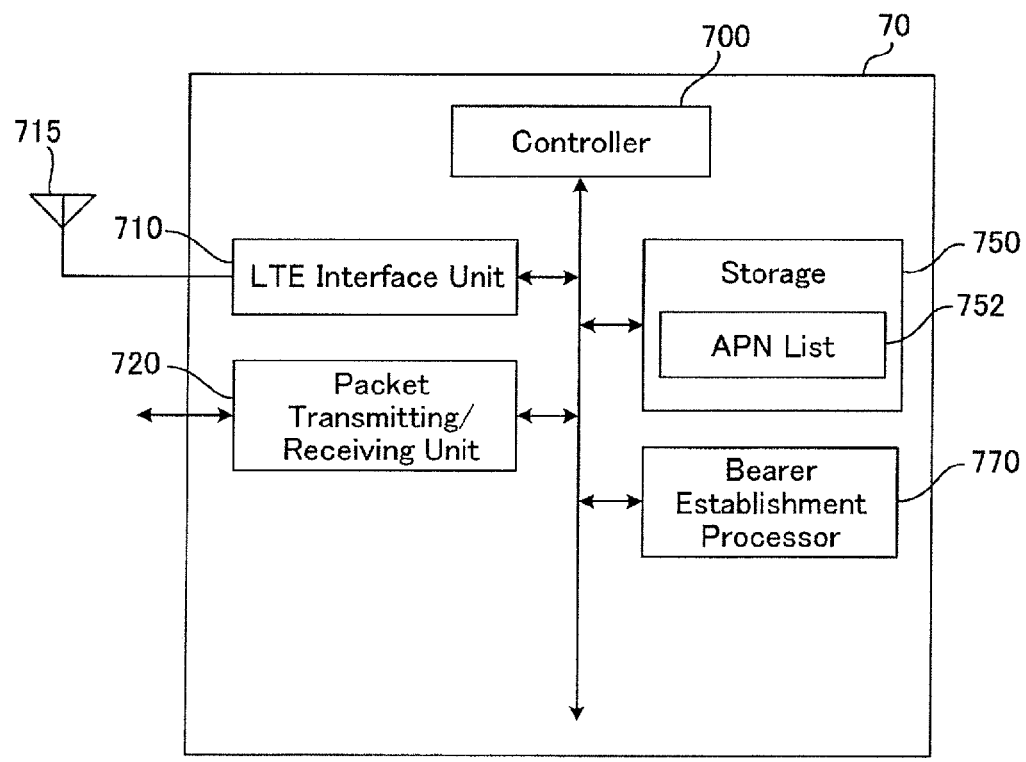
FIG. 15 is a block diagram of a UE in the first embodiment.

Next, the configuration of UE 70 as mobile station in the present embodiment will be described. As a specific example of UE 70, mobile terminals that connect to the mobile communication system via radio access interface, PDAs and other terminals are presumed. As shown in FIG. 15, controller 700 is connected with an LTE interface unit 710, a packet transmitting/receiving unit 720, a storage 750 and a bearer establishment processor 770 by a bus.

Controller 700 is a functional unit for controlling UE 70. The controller reads out and runs various programs stored in storage 750 to thereby realize various processes.

LTE interface unit 710 is a functional unit with which UE 70 connects to home base station 60. LTE interface unit 710 is connected with an external antenna 715.

Packet transmitting/receiving unit 720 is a functional unit for transmitting and receiving specific data (packets). The packet transmitting/receiving unit decomposes the data received from the superior layer into packets so as to be transmitted. The packet transmitting/receiving unit also realizes the function of transferring the received packets to the superior layer.

Storage 750 is a functional unit that stores programs, data and the like necessary for various operations of UE 70. Storage 750 also stores an APN list 752.

Figures 16, 17:
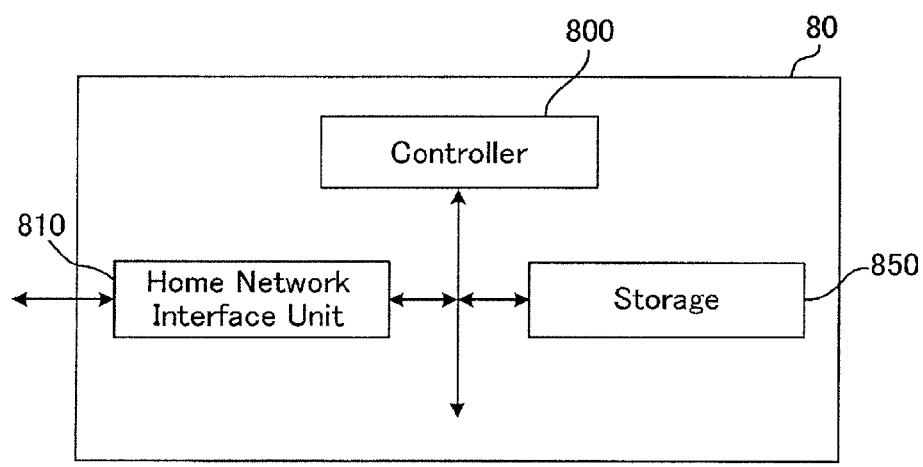
FIG. 16 is a chart showing one example of a UE's APN list in the first embodiment.
FIG. 17 is a block diagram of an information terminal in the first embodiment.

APN list 752 stores APN as candidates for UE 70 when UE 70 connects to the internet. FIG. 16 is a data configurational example of APN list 752. In APN list 752, APN as candidates that UE 70 may use are managed on a list as shown in FIG. 16.

For an APN used for local IP access, the APN is managed together with the CSGID of home base station 60 to which the APN is allotted. The APN allotted to home base station 60 is acquired beforehand from the owner of home base station 60 or the mobile network operator. As the methods for acquisition, there are some methods such as, for example, an APN, which is given by offline notice, may be registered beforehand in UE 70; or an APN that is notified by SMS (Short Message Service) or the like when home base station 60 is accessed, may be automatically registered. However, not limited to these, other methods may be used.

Bearer establishment processor 770 is a functional unit that executes a process for establishing an EPS bearer as a communication path to L-SGW unit 620 inside home base station 60 or to SGW 20 inside the core network.

[1.2.8 Information Terminal Configuration]

Next, the configuration of information terminal 80 in the present embodiment will be described. As shown in FIG. 17, information terminal 80 includes a controller 800 to which a home network interface unit 810 and a storage 850 are connected by a bus.

Controller 800 is a functional unit for controlling information terminal 80. The controller 800 reads out and runs various programs stored in storage 850 to thereby realize various processes.

Home network interface unit 810 is a functional unit for transmitting and receiving packets with other apparatus inside the home network. Transmission and reception of packets is performed through, for example, Ethernet (registered trademark), which is generally used as a network connecting standard, or the like.

Storage 850 is a functional unit that stores programs, data and the like necessary for various operations of information terminal 80.

[1.3 Description of Processing]

Next, the procedures for UE 70 to use the core network and local IP access via home base station 60 in mobile communication system 1 shown in FIG. 1 will be described with reference to the drawings.

[1.3.1 Home Base Station Registering Process]

To begin with, the registering procedure of home base station 60 to mobile communication system 1 will be described using FIG. 18.

Home base station 60 transmits an S1 setup request to MME 40 (S100). Here, the S1 setup request is implemented to establish a communication path between LTE base station unit 630 of home base station 60 and MME 40 so that home base station 60 can operate as a base station of mobile communication system 1, and includes a CSGID assigned to home base station 60. Then MME 40 transmits an S1 setup response (S102).

Next, differing from the prior art, home base station 60 transmits a local IP access registering request to MME 40 to request MME 40 to register itself as a home base station offering local IP access functionality (S104). The local IP access registering request includes the CSGID assigned to home base station 60, an APN used for local IP access ("BOB'S_HOME"), IP address of L-PGW unit 610 and IP address of L-SGW unit 620.

Based on the acquired APN, IP address of L-PGW unit 610 and IP address of L-SGW unit 620, MME 40 updates APN-IP address translation DB 454 (S106). Specifically, the database is updated from the state in FIG. 9 to the state in FIG. 19. Then, the APN used for local IP access and the IP addresses of L-PGW unit 610 and L-SGW unit 620, to which the APN is assigned, are stored in a related manner. Then, MME 40 transmits a local IP access registration permission to home base station 60 (S108). In this way, the registering process of home base station 60 is completed.

[1.3.2 Process of UE Attachment to Home Base Station]

Figure 20:
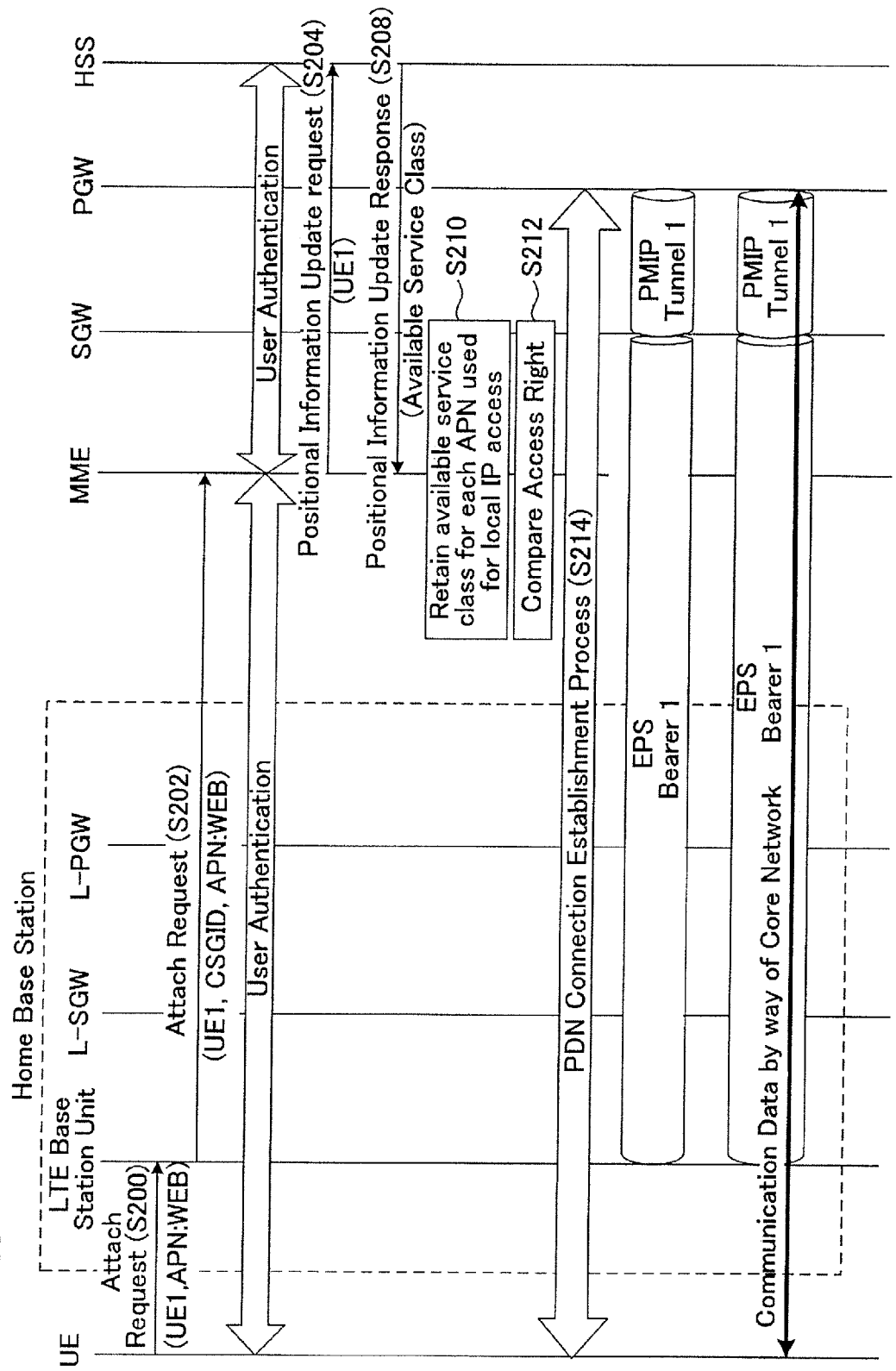
FIG. 20 is a diagram showing a sequence example of a UE's process of attachment to a home base station in the first embodiment.

Next, the procedure in which UE 70 connects to the core network via home base station 60 and is connected to a foreign PDN identified by the APN of "WEB", will be described using FIG. 20.

First, in order to connect to the core network via home base station 60, UE 70 transmits an attach request to home base station 60, following the configuration technique defined in non-patent document 1 (S200). The attach request includes a UE identifier (UE 1), an APN ("WEB") to identify the destination PDN, UE capability that represents UE's retention function, and the like.

Home base station 60 transmits a CSGID of itself (named "CSGID 1") together with the received attach request, to MME 40 (S202).

MME 40, following the prior art method, extracts the UE identifier included in the attach request to perform user authentication and further transmits a positional information update request to HSS 30 to acquire the subscription data of UE 70 (S204).

HSS 30 extracts only the information whose UE identifier corresponds to UE1, from the subscription DB shown in FIG. 6, and transmits the extracted information included in a positional information update response, to MME 40 (S208). Here, differing from the prior art, not only the list of CSGIDs to which access right is being given, but also available service for each APN used for local IP access are transmitted.

Then, MME 40 stores the extracted information into subscription DB 452 of UE 70, as shown in FIG. 8 (S210).

Further, MME 40 compares CSGID1 of home base station 60 to which UE 70 is connecting, with the acquired subscription data (S212). Thereby, whether or not UE 70 has access right to connect to home base station 60 is checked (S212). If the UE has no access right, MME 40 transmits a refusal of attachment, to UE 70 by way of home base station 60, and the attach process is ended as the attach process has been failed.

When the access right has been authorized, MME 40 performs a PDN connection establishment process for UE 70 that has been allowed to connect, following the conventional method (S214). A PDN connection is a logical path that is established between a UE and a PDN, is constructed of an EPS bearer established between home base station 60 and SGW 20 and a PMIP tunnel established between SGW 20 and PGW 10. The PDN connection establishment process is carried out between MME 40, SGW 20 and PGW 10. Though the present embodiment was described taking a case where a PMIP tunnel is established, a method of establishing a GTP (GPRS Tunneling Protocol) tunnel between SGW 20 and PGW 10 may be used instead.

When the PDN connection establishment process is complete, the IP address of UE 70 is related with the transmission path in the binding information inside PGW 10, as shown in FIG. 3, so that UE 70 becomes able to transmit and receive communication data by way of the core network.

Specifically, the communication data addressed to UE 70, received by PGW 10 is forwarded to home base station 60 by way of PMIP tunnel 1 and EPS bearer 1 and is transmitted to UE 70. On the other hand, the communication data transmitted from UE 70 and addressed to the PDN is forwarded to the PDN by way of EPS bearer 1 and PMIP tunnel 1.

In the above way, the attach process of UE 70 to home base station 60 is complete. Here, since at this point UE 70 has established only the PDN connection by way of the core network, the communication data toward the internet is all transmitted by way of the core network.

[1.3.3 Attach Process for Local IP Access]

Figure 21:
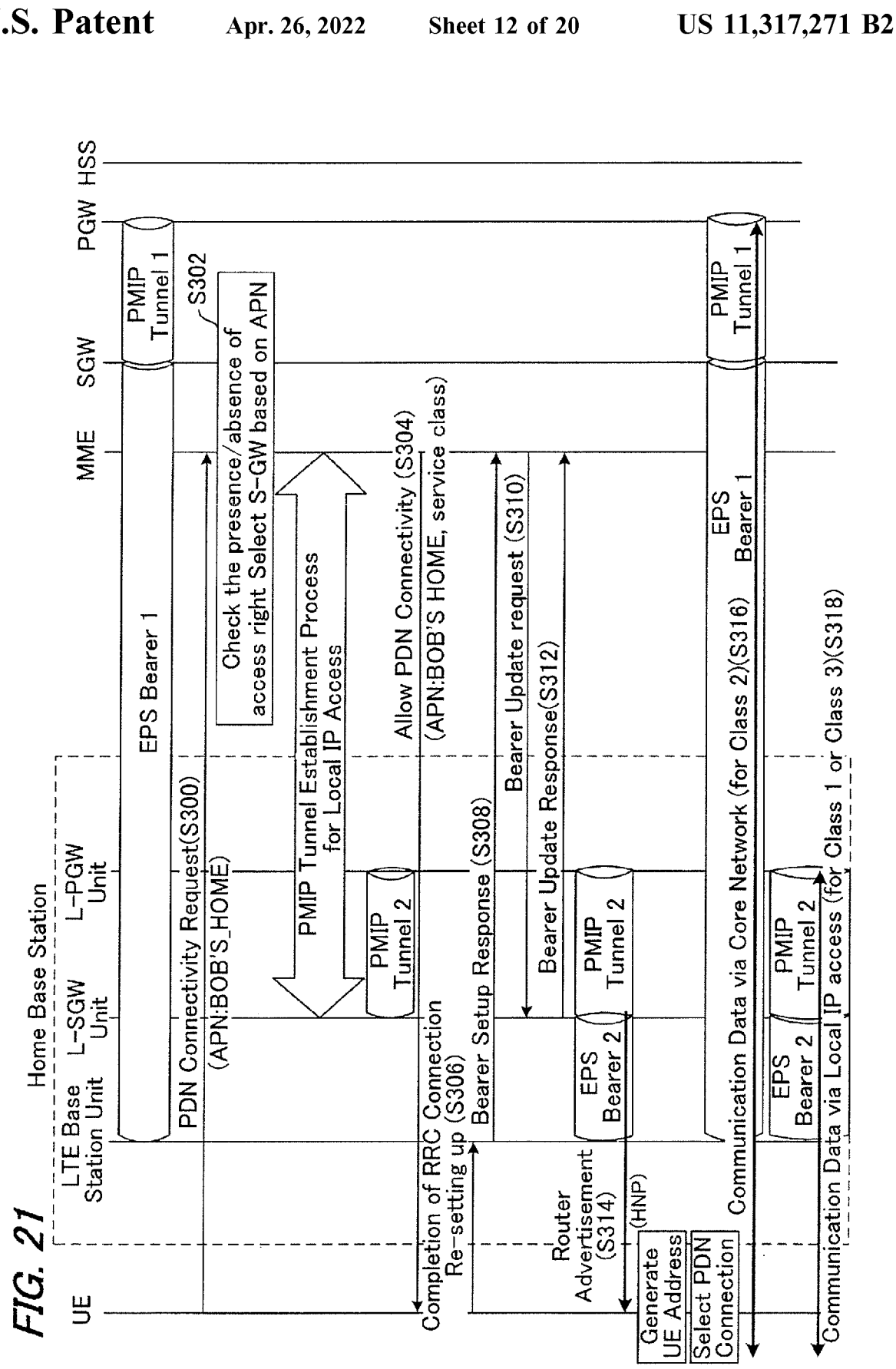
FIG. 21 is a diagram showing a sequence example of a UE's attach procedure for local IP access in the first embodiment.

Next, UE 70 begins connection by local IP access by way of home base station 60. Now, the attach process for local IP access will be described with reference to FIG. 21.

Here, this attach process may be manually actuated by the user when, for example, the completion of attachment to the core network by way of home base station 60 is displayed on the display or the like of UE 70. Alternatively, it is also possible to set UE 70 beforehand such that the attach process for local IP access is automatically started when the UE has attached to a particular home base station. It is also possible to use other methods, not limited to the above.

First, in order to perform local IP access by way of home base station 60, UE 70 transmits a PDN connectivity request to MME 40 (S300). Here, in order to clarify that connection is through local IP access, the APN (BOB'S_HOME) assigned to home base station 60 is designated as the destination APN.

Figure 22:
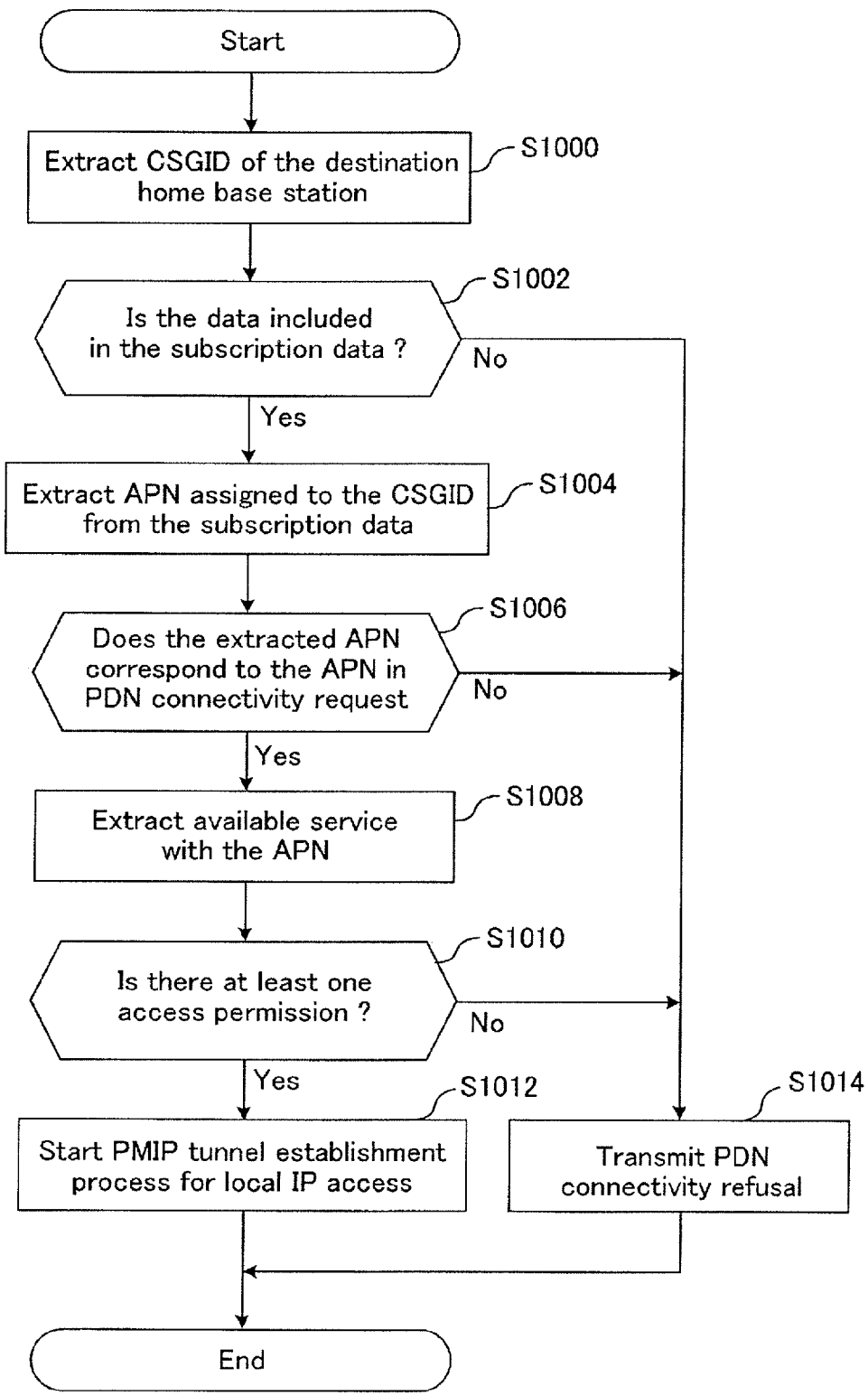
FIG. 22 is a diagram showing a flow chart of MME's access right deciding process in the first embodiment.

As receiving the PDN connectivity request, MME 40 checks whether the right of access to the local IP access is given or not by referring to the stored subscription data corresponding to UE 70 (S302). Now, the process of determining the access right will be described with reference to the flow chart in FIG. 22.

First, the CSGID of the destination home base station 60 to which UE 70 is being connected is extracted (Step S1000). Then, it is confirmed whether or not the extracted CSGID1 of home base station 60 is included in the list of CSGIDs which are allowed to access, in the subscription data corresponding to UE 70, by referring to subscription DB 452 (Step S1002). Herein, if not included (Step S1002; No), a refusal of PDN connectivity is transmitted to UE 70 to complete the attach process (Step S1014).

If the extracted one is included in the list of CSGIDs which are allowed to access, in the subscription data corresponding to UE 70 (Step S1002; Yes), the APN assigned to the CSGID is extracted from subscription DB 452 (Step S1004). At this point, it is checked whether the extracted APN is identical with the APN that is contained in the PDN connectivity request (Step S1006). If the APN is not identical (Step S1006; No), this means that a connection request is made to an APN that is assigned to a home base station 60 different from the home base station 60 to which UE 70 is currently connecting, hence a PDN connectivity refusal is returned (Step S1014) and the attach process is ended.

On the other hand, when the APN is identical (Step S1006; Yes), services available for the APN are extracted (Step S1008). At this point, if access right is given to any one of them (Step S1010; Yes), a PMIP tunnel establishment process used for local IP access described hereinbelow is started (Step S1012). If no access right for any service class is given (Step S1010; No), MME 40 transmits a PDN connectivity refusal to UE 70 (Step S1014), and the attachment process is immediately ended without starting the PMIP tunnel establishment process used for the local IP access with home base station 60 described as follows. In this case, UE 70 cannot use local IP access.

[1.3.3.1 PMIP Tunnel Establishment Process used for Local IP Access]

Figure 23:
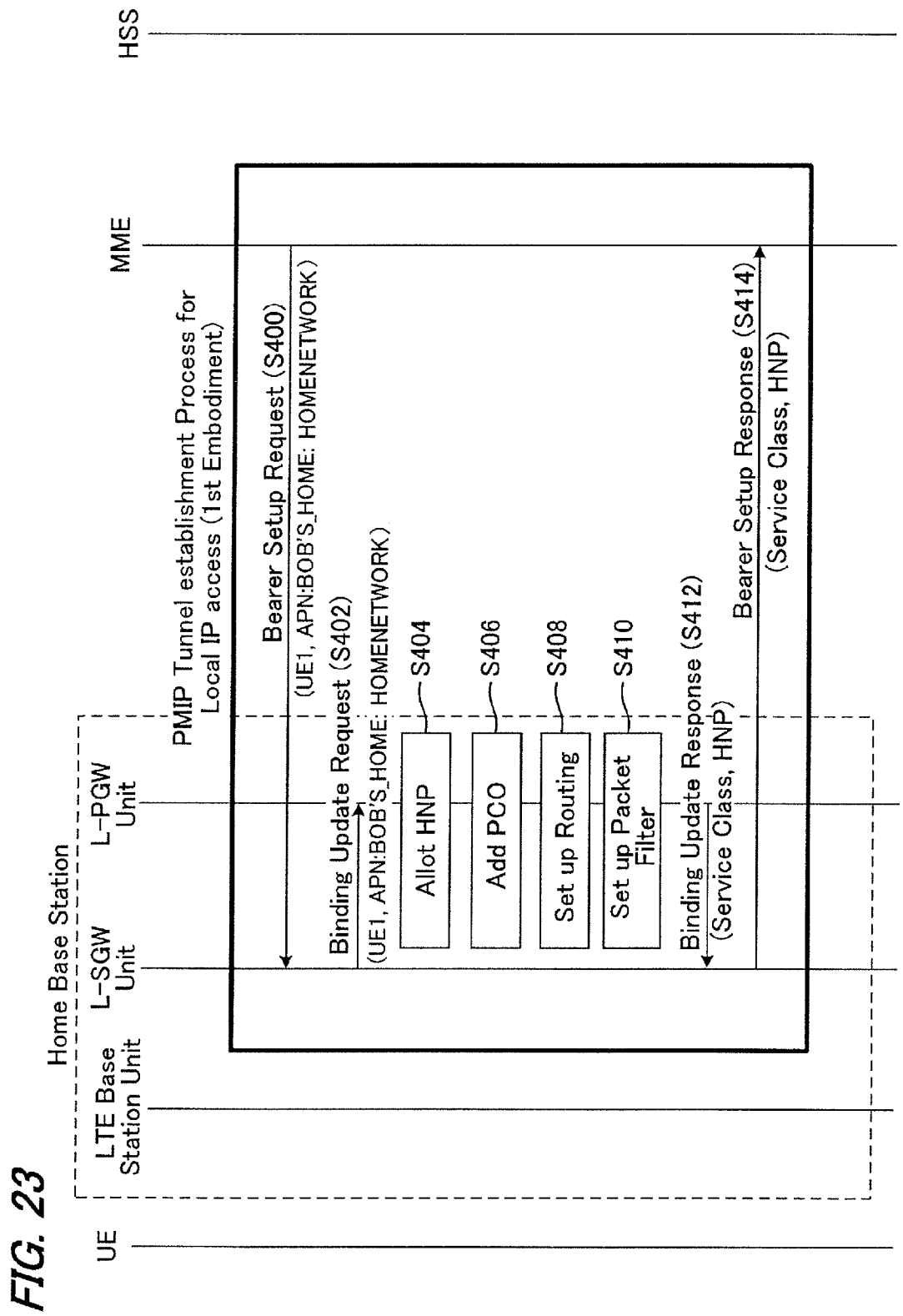
FIG. 23 is a diagram showing a sequence example of a PMIP tunnel establishment process for local IP access in the first embodiment.

FIG. 23 is a diagram showing in detail the PMIP tunnel establishment process used for the local IP access.

First, MME 40 transmits a bearer setup request to L-SGW unit 620 (S400). The bearer setup request includes a UE identifier (UE1) and an APN. However, differing from the prior art, the APN is added with information that represents the service class that is allowed for use. For example, the following three kinds of character strings are defined for service classes.

When internet connection is available: ";INTERNET"; when home network connection is available: ";HOMENETWORK"; and when internet connection and home network connection are available: ";INTERNET&HOMENETWORK".

Then, MME 40 refers the subscription data of retained UE 70 to subscription DB 452, and if, for example, home network connection is allowed, the character string ";HOMENETWORK" is added after the original APN "BOB'S_HOME", so as to use "BOB'S_HOME;HOMENETWORK" as a new APN.

L-SGW unit 620 receives the bearer setup request, and transmits a binding update request to L-PGW unit 610 (S402) in order to establish a PMIP tunnel between L-SGW unit 620 and L-PGW unit 610. The binding update request includes a UE identifier (UE1) and the updated APN ("BOB'S_HOME; HOMENETWORK").

L-PGW unit 610 receives the binding update request, and allots HNP2 to UE 70 first, to generate binding information shown in FIG. 12 (S404). Here, it is assumed that the HNP to be allotted is selected from IP address pool held by home base station 60. In this case, it is assumed that "2001:100: 200;4000::/64" is allotted as HNP2.

Then, differing from the prior art, in order to notify UE 70 of the service class of services that are allowed for use by way of local IP access, the information on the service class to be stored in PCO (Protocol Configuration Option) is determined (S406). Here, PCO is a 3GPP-defined information field capable of storing setup information that is exchanged between L-PGW unit 610 and UE 70 only, and is carried to UE 70 by way of L-SGW unit 620, MME 40 and LTE base station unit 630.

As to information to be included in PCO, specifically, any of the following information should be included based on the access right information added to the APN included in the binding update request.

Class 1: capable of using internet connection;
Class 2: capable of using home network connection; and
Class 3: capable of using internet connection and home network connection.

If, for example, the APN includes predetermined information that can be tell that connection to a home network is permitted (e.g., a character string ";HOMENETWORK"), PCO is stored with "class 2".

Further, L-PGW unit 610 performs routing (S408) by establishing a PMIP tunnel 2 between L-PGW unit 610 and L-SGW unit 620 so that when receiving communication data addressed to HNP2 assigned to UE 70, the L-PGW unit forwards the communication data to L-SGW unit 620 via PMIP tunnel 2. In addition, L-PGW unit 610, referring to packet filtering information 652 in FIG. 13 based on the access right information, performs packet filter setting up to determine whether each communication data packet should be forwarded or not based on the packet filtering process described next (Step S410).

Figure 24:
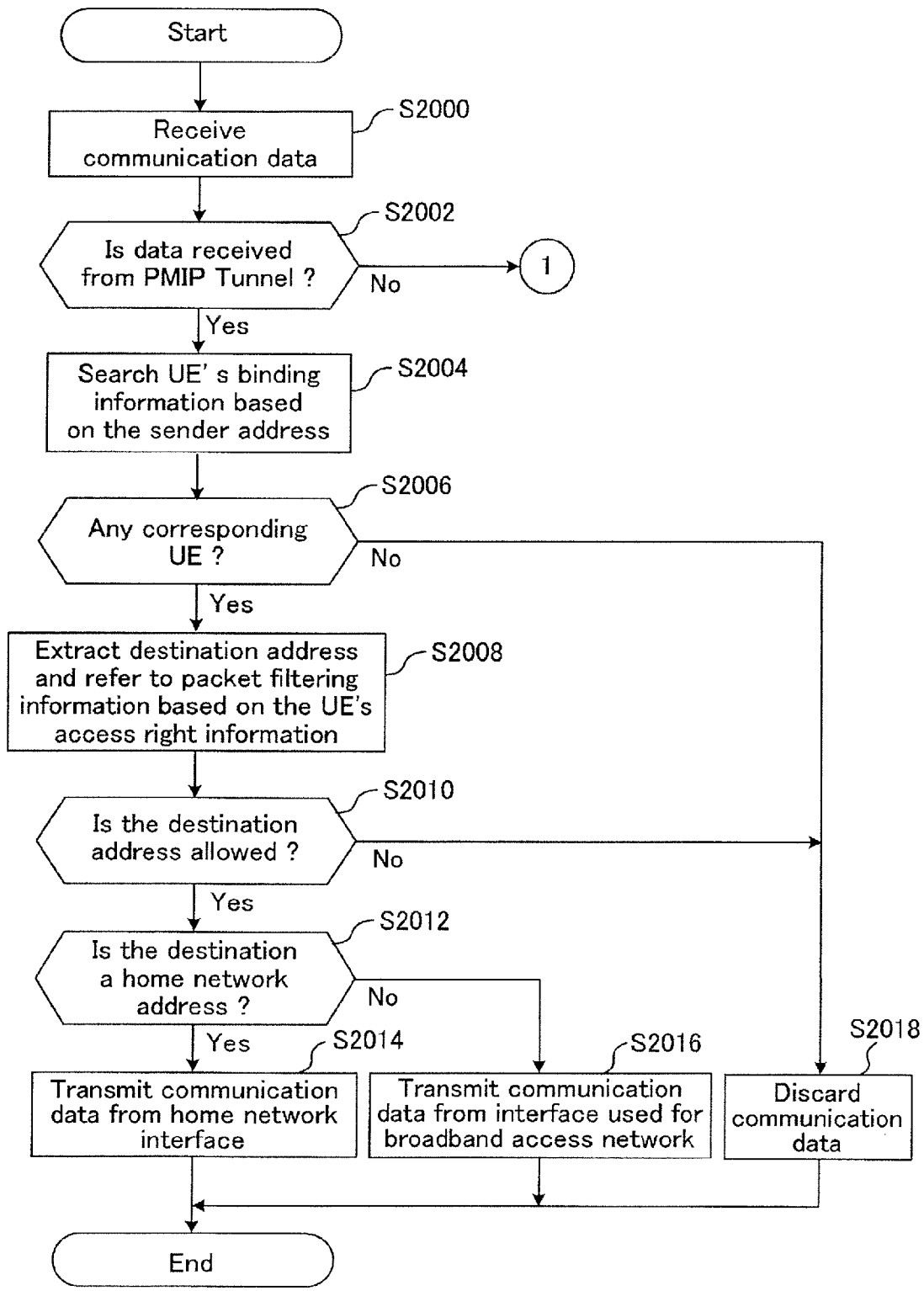
FIG. 24 is a diagram showing a flow chart of a packet filtering process at a home base station in the first embodiment.
Figure 25:
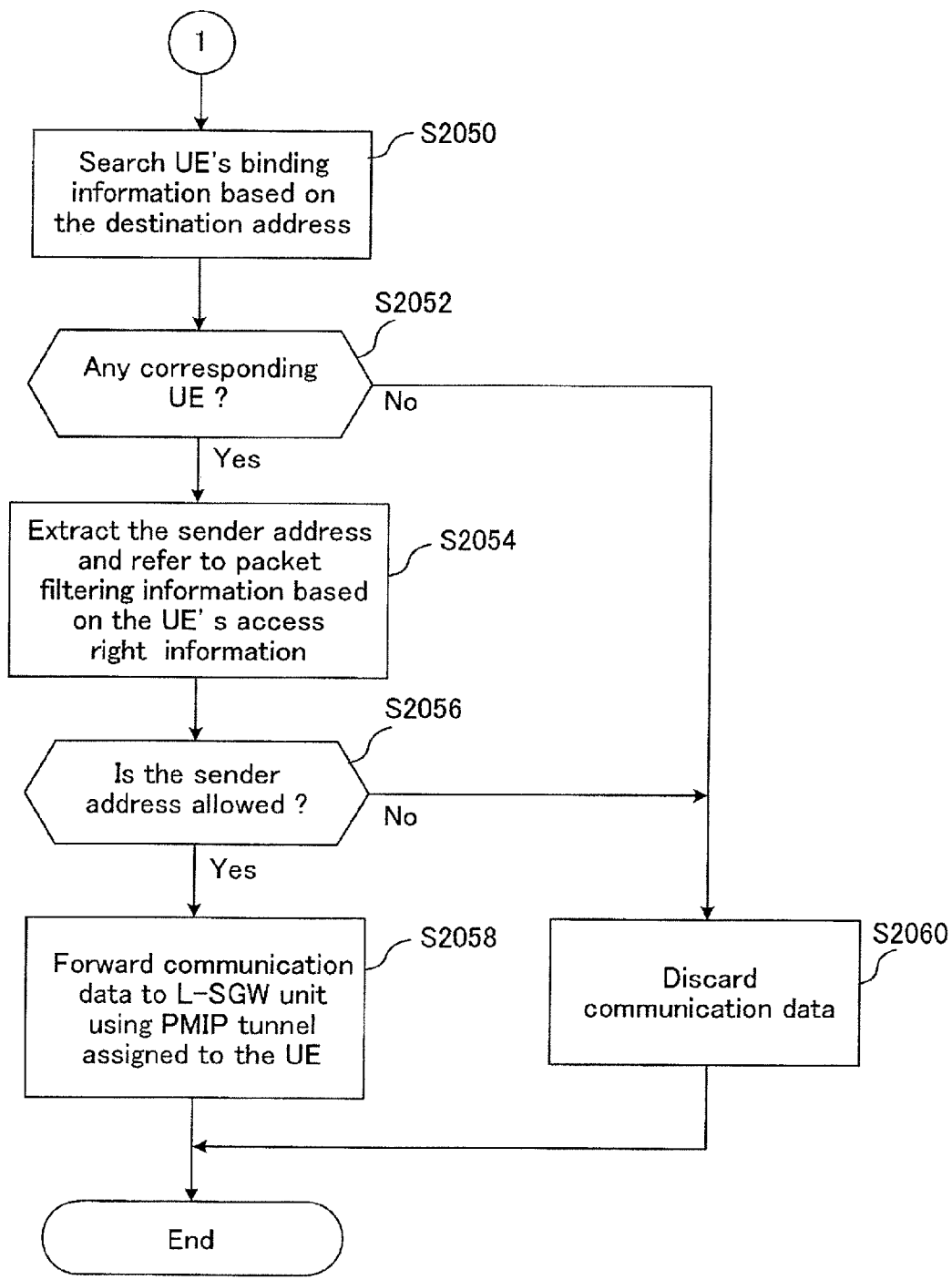
FIG. 25 is a diagram showing a flow chart of a packet filtering process at a home base station in the first embodiment.

FIGS. 24 and 25 show a flow chart of the packet filtering process, which will be described hereinbelow.

First, L-PGW unit 610 receives communication data (Step S2000) and determines whether or not the communication data has been received by way of a PMIP tunnel (Step S2002).

Herein, if the communication data is one that was received by way of a PMIP tunnel (Step S2002; Yes), the binding information of the UE is searched based on the sender address (Step S2004). Specifically, the L-PGW unit extracts the sender address and searches the binding information corresponding to the sender address.

Subsequently, whether or not there exists a corresponding UE is determined (Step S2006). Specifically, this is determined by checking whether the prefix portion (for the upper 64 bits) of the sender address corresponds to the HNP of a UE included in binding information 612.

When there is a correspondence (Step S2006; Yes), then the destination address is extracted and referred to the packet filtering information, based on the access right information of UE 70 (Step S2008). Then, it is determined whether or not the destination address is one that is allowed (Step S2010).

When no corresponding UE is found at Step S2006 (Step S2006; No) or when ate Step S2010 the destination address is an unallowed address (Step S2010; No), the received communication data is discarded (Step S2018) and this process is ended.

On the other hand, when the destination address is an allowed address at Step S2010 (Step S2010; Yes), it is further determined whether or not the destination address is the address to a home network (Step S2012). When the destination address is an address to a home address (Step S2012; Yes), home network interface unit 660 is used to transmit communication data (Step S2014); otherwise (Step S2012; No), interface unit 670 used for broadband access network is used to transmit communication data (Step S2016). Then, after transmission of communication data, this process is ended.

When reception is not through a PMIP tunnel at Step S2002 (Step S2002; No), the binding information of the UE is searched based on the destination address (Step S2050 in FIG. 25). Then, it is determined whether or not the prefix portion (for the upper 64 bits) of the destination address corresponds to the HNP of a UE included in binding information 612 (Step S2052).

When there is a correspondence (Step S2052; Yes), then the sender address is extracted so as to refer to the packet filtering information, based on the access right information of the UE (Step S2054). Then, it is determined whether or not the sender address is one that is allowed (Step S2056).

When no correspondence is found at Step S2052 (Step S2052; No) or when the address is unallowed at Step S2056 (Step S2056; No), the received communication data is discarded (Step S2060) and the process is ended.

On the other hand, when the sender address is an allowed address at Step S2056 (Step S2056; Yes), the PMIP tunnel assigned to UE 70 is used to forward the communication data to L-SGW unit 620 (Step S2058), and this process is ended.

After completion of packet filter setting up, L-PGW unit 610 returns a binding update response to L-SGW unit 620 (S412). The message includes the assigned HNP and PCO stored with the class of access right information.

Thereafter, L-SGW unit 620 having received the binding update response transmits a bearer setup response to MME 40 (S414). Here, the bearer setup response includes the PCO set with the aforementioned service class and HNP.

By the procedures described above, the PMIP tunnel establishment process used for the local IP access is completed, so that establishment of PMIP tunnel 2 is completed and only the communication data allowed based on the access right information can be forwarded.

[1.3.3.2 EPS Bearer Establishment Process]

Returning next to FIG. 21, the following process will be described.

First, MME 40 having received the bearer setup response, transmits a PDN connectivity permission to the UE by way of LTE base station unit 630 (S304). The PDN connectivity permission includes an APN and PCO.

UE 70 receives the PDN connectivity permission. Then, from PCO, the UE acquires the information on the access right that is set at destination home base station 60. Further, the UE transmits a RRC connection re-setting up complete message to LTE base station unit 630 (S306).

LTE base station unit 630 transmits a bearer setup response to MME 40 (S308). MME 40 receives the bearer setup response and transmits a bearer update request including the IP address of home base station 60 to L-SGW unit 620 (S310).

L-SGW unit 620 returns a bearer update response to MME 40 (S312), and acquires the IP address of home base station 60 to establish EPS bearer 2.

Then, L-SGW unit 620 transmits a router advertisement stored with the HNP acquired in the PMIP tunnel establishment process used for local IP access, to UE 70 (Step S314).

UE 70 takes out the HNP from the received router advertisement and generates an IPv6 address of itself using the HNP to form a state capable of transmitting and receiving communication data for local IP access.

As described heretofore, UE 70 establishes both the PDN connection via the core network (S316) and the PDN connection via local IP access (S318), simultaneously.

[1.3.4 Transmission and Reception Process of UE's Communication Data]

Figure 26:
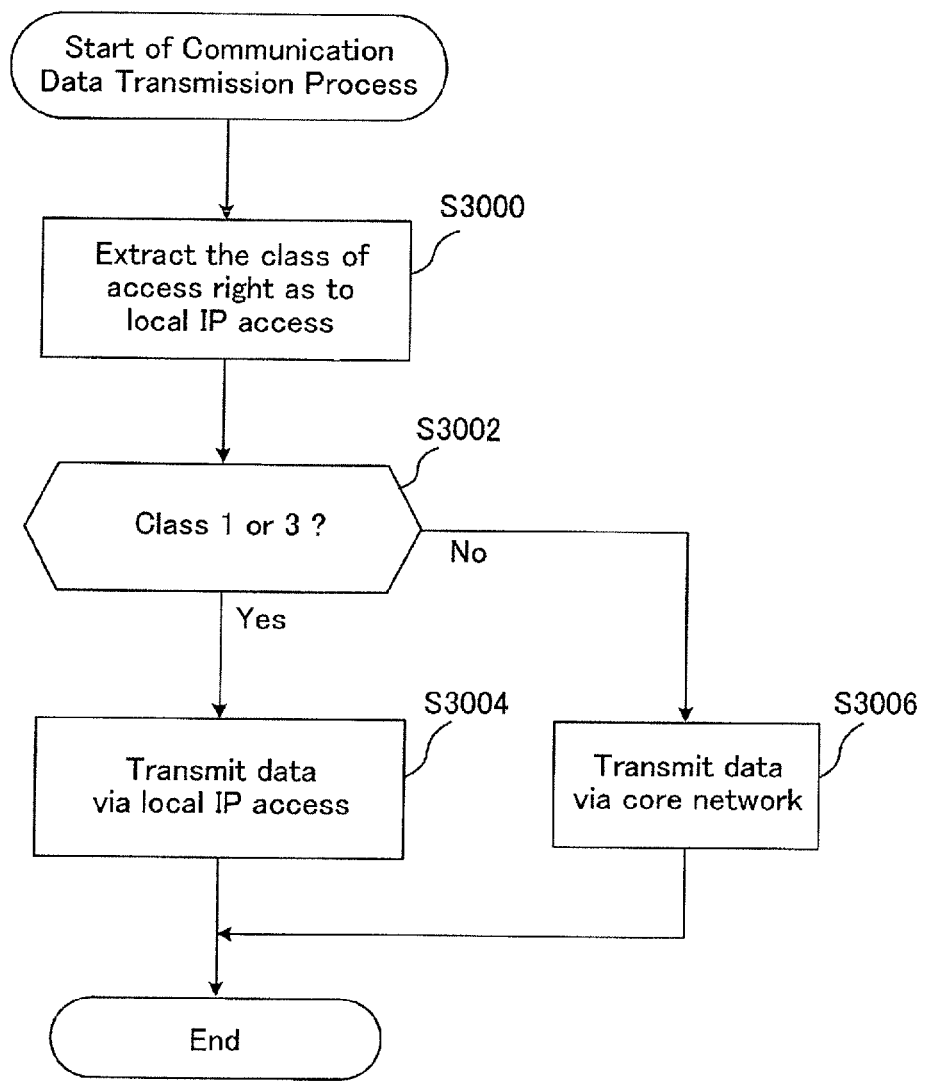
FIG. 26 is a diagram showing a flow chart of a UE's PDN connection selecting process in the first embodiment.

When connecting to the internet by means of an application such as a WEB browser etc., UE 70 selects one PDN connection from the two established PDN connections, in accordance with the procedure shown in FIG. 26 to perform transmission and reception of communication data.

First, the access right information on local IP access, included in the PCO acquired by PDN connectivity permission is extracted (Step S3000).

Then, based on the access right information extracted at Step S3000, if the class is 1 or 3, or when internet connection service is available by way of local IP access (Step S3002; Yes), the UE selects the PDN connection via local IP access (composed of EPS bearer 2 and PMIP tunnel 2) to transmit data (Step S3004).

When the class is 2, or when internet connection service is not available via local IP access (including class 2) (Step S3002; No), the UE selects the PDN connection via the core network (formed of EPS bearer 1 and PMIP tunnel 2) to transmit data (Step S3006).

Then, using the selected PDN connection, communication data from UE 70 is forwarded and sent out to the foreign PDN. Communication data from the foreign PDN to UE 70 is also brought to UE 70 via the same route.

On the other hand, when UE 70, defying the access right information, transmits communication data to the internet using the PDN connection via local IP access despite that the internet connection service via local IP access is not available, the communication data is discarded by the above-described packet filtering process at L-PGW unit 610.

When transmitting communication data to the home network, UE 70 uses the PDN connection via local IP access while L-PGW unit 610 performs a packet filtering process to determine whether the transfer is allowed or not.

In this way, in the present embodiment, for the service using the local IP access functionality of the home base station, the owner of the home base station and the mobile network operator can set up the access right of each UE for each service, hence it is possible to realize various usage scenarios of the home base station.

Further, the home base station can perform packet filtering based on the service class for which access right is given to a UE. Even if a UE that is not allowed to use internet connection service via local IP access, has transmitted communication data directed to the internet, intentionally or by mistake, the home base station can detect and discard the communication data. Further, the communication data directed in reverse is also packet filtered in accordance with the access right.

Further, since the home base station notifies a UE of whether or not the UE can use internet connection service using local IP access, the UE can correctly determine whether to try to connect to the internet via the core network or whether to try to connect to the internet via local IP access.

Moreover, this access right information on local IP access to be notified to a UE is stuffed in PCO and given to the UE by the L-PGW unit of the home base station. With this scheme, the notification of access right information to a UE will not need any extension of other apparatus than the L-PGW unit and UE.

Further, the MME adds a special character string to the APN to thereby notify the home base station of the access right as to local IP access, so that access control of a UE is made in accordance with that notified right. With this arrangement, the home base station can give notice of access right information without the need of either retaining access right information for each UE or adding new information fact to a bearer setup request defined in non-patent document 1.

Further, accessible APNs used for local IP access and access right information for every UE are integrally managed in the subscriber information management apparatus, so that the home base station can use the information to control access. With this arrangement, it becomes possible for the owner of the home base station and the mobile network operator to easily set up and manage access right information.

Although the present embodiment was described taking an example of establishing a PMIP tunnel by using a binding update request and a binding update response between L-PGW unit 610 and L-SGW unit 620, the invention should not be limited to this. It is possible to use a method of establishing a transmission path that is equivalent to a PMIP tunnel by establishing a GTP tunnel using a bearer establishment request and a bearer establishment response, instead.

Further, though the present embodiment was described taking an example of a case where L-PGW unit 610 and L-SGW unit 620 inside home base station 60 are configured as separate functional units, but the invention should not be limited to this. L-PGW unit 610 and L-SGW unit 620 may be configured as an integrated functional unit. In this case, control messages (binding update request and binding update response) transmitted and received between L-PGW unit 610 and L-SGW unit 620 are processed within the closed functional unit.

Moreover, though the present embodiment was described taking an example of a case where home base station 60 also includes a constituent as a gateway to a broadband access network, the present invention should not be limited to this. It is also possible to configure the interface unit 670 used for the broadband access network of home base station 60 and home network interface unit 660 alone as a separate apparatus (which will be referred to hereinbelow as home gateway) while home base station 60 may include controller 600 to which L-PGW unit 610, L-SGW unit 620, LTE base station unit 630, storage 650 and home network interface unit 660 are connected by a bus. In this case, home base station 60, the home gateway and information terminal 80 are mutually connected via a home network interface.

Further, though the present invention was described taking an example of a case where a UE performs communication using IPv6, a similar procedure can be carried out in a case using IPv4 addresses. However, IPv4 global addresses are running out, so that it is expected to be difficult for an operator of offering broadband access service to assign a large number of IPv4 address blocks to individual home base stations. In this case, when internet connection through local IP access is used, it is presumed that address translation based on NAT (Network Address Translation) is used. First, private address space such as 192.168.0.0/16 may be managed in the IP address pool inside the home base station so as to allot IPv4 addresses to the UEs connecting to the home base station with Pv4 addresses having a different subnet in the order of "192.168.1.1/net mask 255. 255. 255.0", "192.168.2.1/net mask 255. 255. 255.0", "192.168.n.1/net mask 255. 255. 255.0" (n is 3 to 255), for example.

Further, though the present invention was described taking an example of a case where MME40 holds APN-IP address translation DB 454, the database part may be given as a separate apparatus while translation of an APN to an IP address may be performed by MME 40 making an inquiry to the database apparatus. Moreover, when a plurality of MMEs 40 are installed in mobile communication system 1 for redundant design, it is possible to provide such a configuration that each MME 40 makes an inquire to the database apparatus.

Further, though the present invention was described taking an example of a case where home base station 60 is connected to SGW 20 and MME 40 by way of GW 50, the invention should not be limited to this; home base station 60 may be directly connected to SGW 20 and MME 40.

2. The Second Embodiment

Next, the second embodiment of the present invention will be described. This embodiment has the same network configuration and apparatus configuration as those of the first embodiment, except for the configuration of home base station 60, so that detailed description of the other configurations than that of home base station 60 is omitted.

[2.1 Apparatus Configuration]

First, each apparatus configuration will be briefly described with reference to the drawings.

[2.2 Home Base Station]

Figures 27, 28:
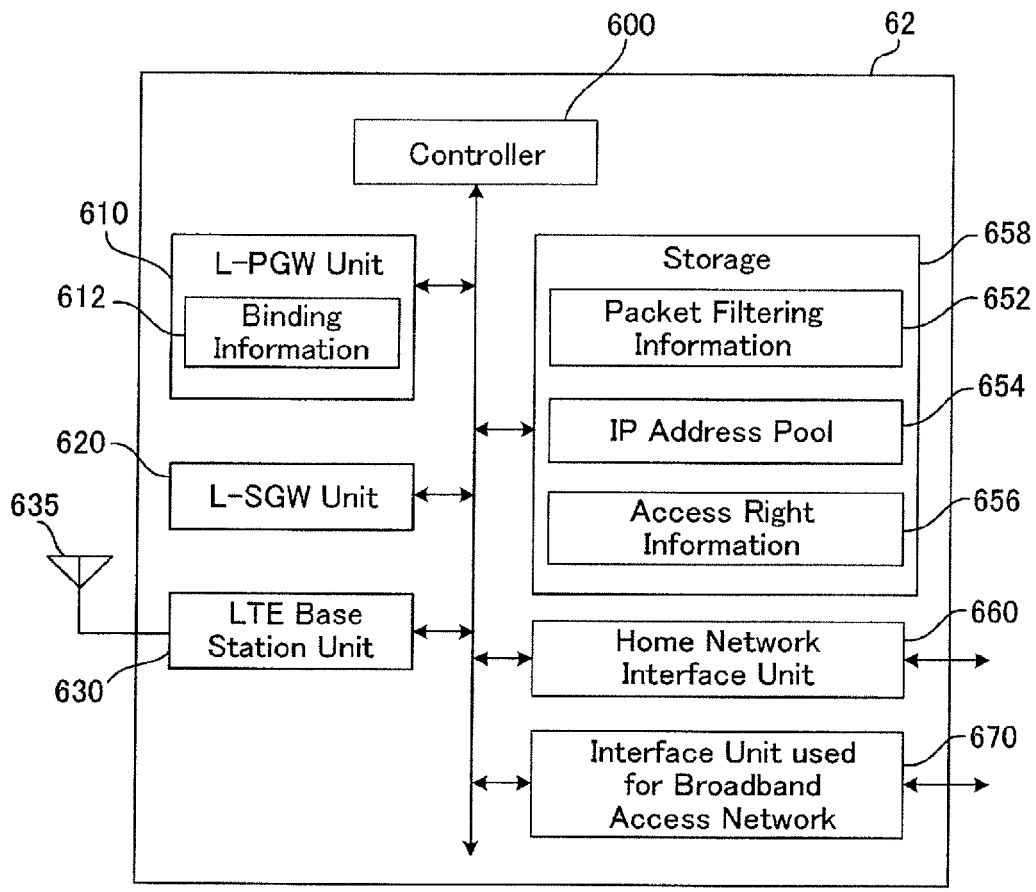
FIG. 27 is a block diagram showing a home base station in the second embodiment.
FIG. 28 is a chart showing one example of access right information at a home base station in the second embodiment.

The configuration of a home base station 62 in the present embodiment will be described. FIG. 27 is a diagram showing one example of the configuration of home base station 62, which is different from the configuration of home base station 60 in the first embodiment in that access right information 656 is recorded in a storage 658 (650).

FIG. 28 is a diagram showing one example of access right information 656, which shows a UE identifier (e.g., "UE1") and available service (e.g., "class 1; internet connection disallowed", "class 2: home network connection allowed", and the like) for every UE that comes to connect to home base station 62.

It is assumed that the owner of home base station 62 can modify this access right information 656, e.g., add new information of another UE, modify the available service for a particular UE.

Here, it is assumed that when information is added or modified, the information is synchronized with that written in subscription DB 352 of HSS 30 shown in FIG. 6. As an information synchronizing means, when, for example, any change in access right information takes place, home base station 62 may give notice to HSS 30, or subscription DB 352 of HSS 30 may be changed first, then HSS 30 may give notice to home base station 62.

The other configurations are the same as home base station 60 of the first embodiment described with FIG. 11, so that detailed description is omitted.

[2.3 Description of Processing]

First, similarly to the first embodiment, home base station 62 performs a procedure of registration to mobile communication system 1. Further, UE 70 performs an attach process by way of home base station 62. The registering procedure and the present attach process are the same as those in the first embodiment, so that description is omitted.

UE 70 further successively performs an attach process for local IP access by way of home base station 62. Herein, the difference from the first embodiment is the PMIP tunnel establishment process for local IP access. Next, the PMIP tunnel establishment process for local IP access of the present embodiment will be described.

[2.3.1 PMIP Tunnel Establishment Process for Local IP Access (Process Example 2)]

Figure 29:
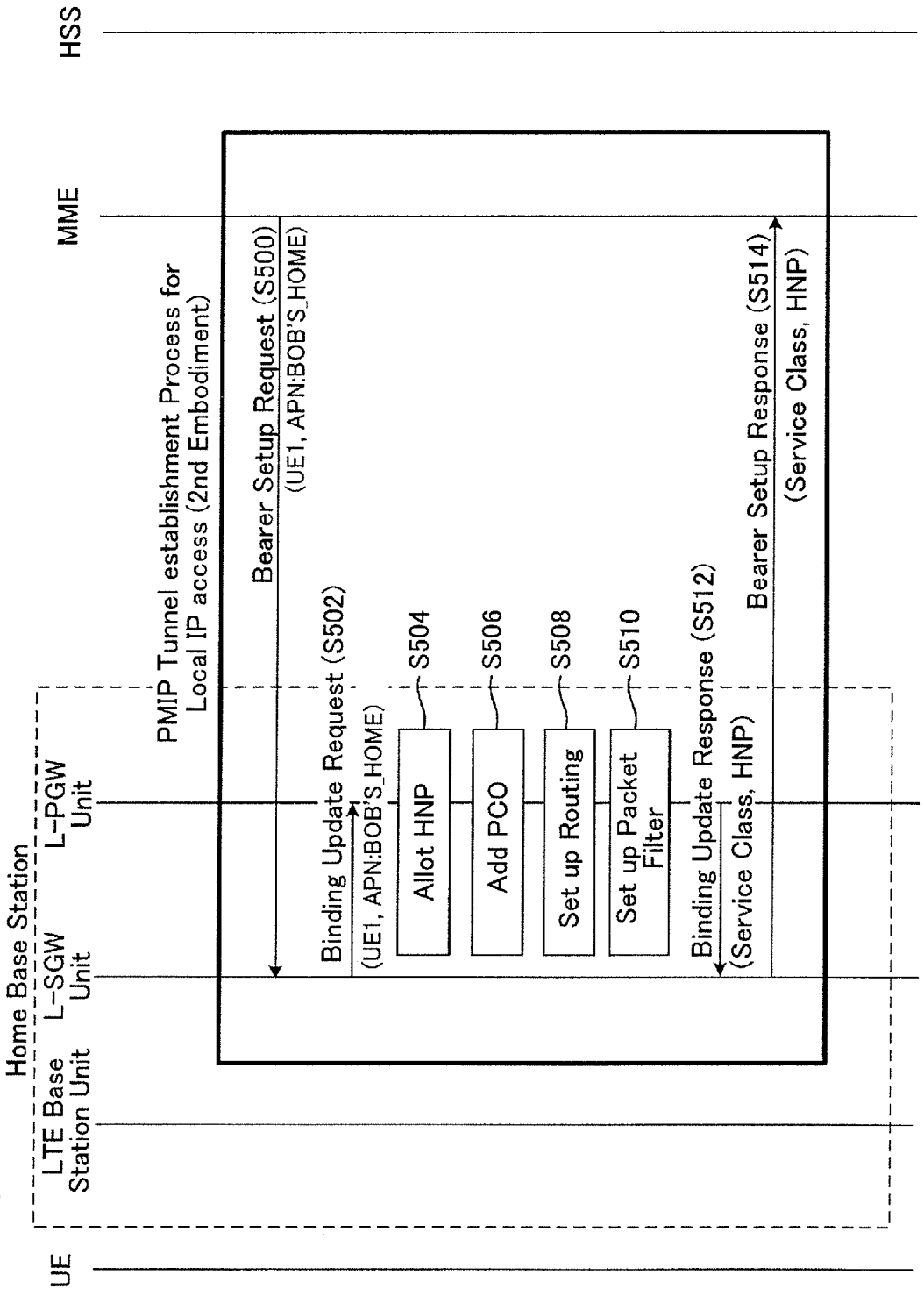
FIG. 29 is a diagram showing a sequence example of a PMIP tunnel establishment process for local IP access in the second embodiment.

FIG. 29 shows a PMIP tunnel establishment process for local IP access.

First, MME 40 transmits a bearer setup request to L-SGW unit 620 (S500). The bearer setup request includes a UE identifier (UE1) and an APN (BOB'S_HOME). However, differing from the first embodiment, the APN is not added with information that represents the service class.

L-SGW unit 620 receives the bearer setup request, and transmits a binding update request to L-PGW unit 610 (S502) in order to establish a PMIP tunnel between L-SGW unit 620 and L-PGW unit 610. The binding update request includes a UE identifier (UE1) and an APN (BOB'S_HOME).

L-PGW unit 610 receives the binding update request, and allots an HNP to the UE first similarly to the first embodiment, to generate binding information shown in FIG. 12 (S504).

Also as for PCO, a similar process is performed (S506). However, when deciding the access right information to be stored in PCO, access right information 656 owned by home base station 62 itself is referred to, instead of making a decision based on the added information to APN.

That is, in accordance with address right information 656, "class 1" is stored into the UE when internet connection alone is allowed to use, "class 2" is stored when home network connection alone is allowed to use, and "class 3" is stored when both internet connection and home network are allowed to use.

Further, L-PGW unit 610 performs routing setup (S508) by establishing a PMIP tunnel 2 between L-PGW unit 610 and L-SGW unit 620 so that when receiving communication data addressed to HNP assigned to UE 70, the L-PGW unit 610 forwards the communication data to L-SGW unit 620 via PMIP tunnel 2. In addition, L-PGW unit 610 performs packet filter setting up to determine whether each communication data should be forwarded or not, based on the packet filtering information (Step S510).

Also as for the packet filtering process, the same process as in the first embodiment is performed. However, a difference is in that the process is performed based on the access right information 656 stored at home base station 62, instead of performing based on the access right information added to APN.

L-PGW unit 610 transmits a binding update response to L-SGW unit 620 (S512). The message includes the assigned HNP and PCO stored with the class of access right information.

Thereafter, L-SGW unit 620 having received the binding update response transmits a bearer setup response to MME 40 (S514). The bearer setup response includes the PCO set with the aforementioned service class and HNP.

By the procedures described above, the PMIP tunnel establishment procedure for local IP access is completed, so that establishment of PMIP tunnel 2 is completed and only the communication data permitted based on the access right information is forwarded.

The procedure afterwards is the same as that in the first embodiment, so that description is omitted.

In this way, according to the second embodiment, since the home base station also holds access right information on each UE similarly to HSS, it becomes no longer necessary to add access right information to APN as an extra step, it is hence possible to minimize addition of functions to the MME.

Figure 18:
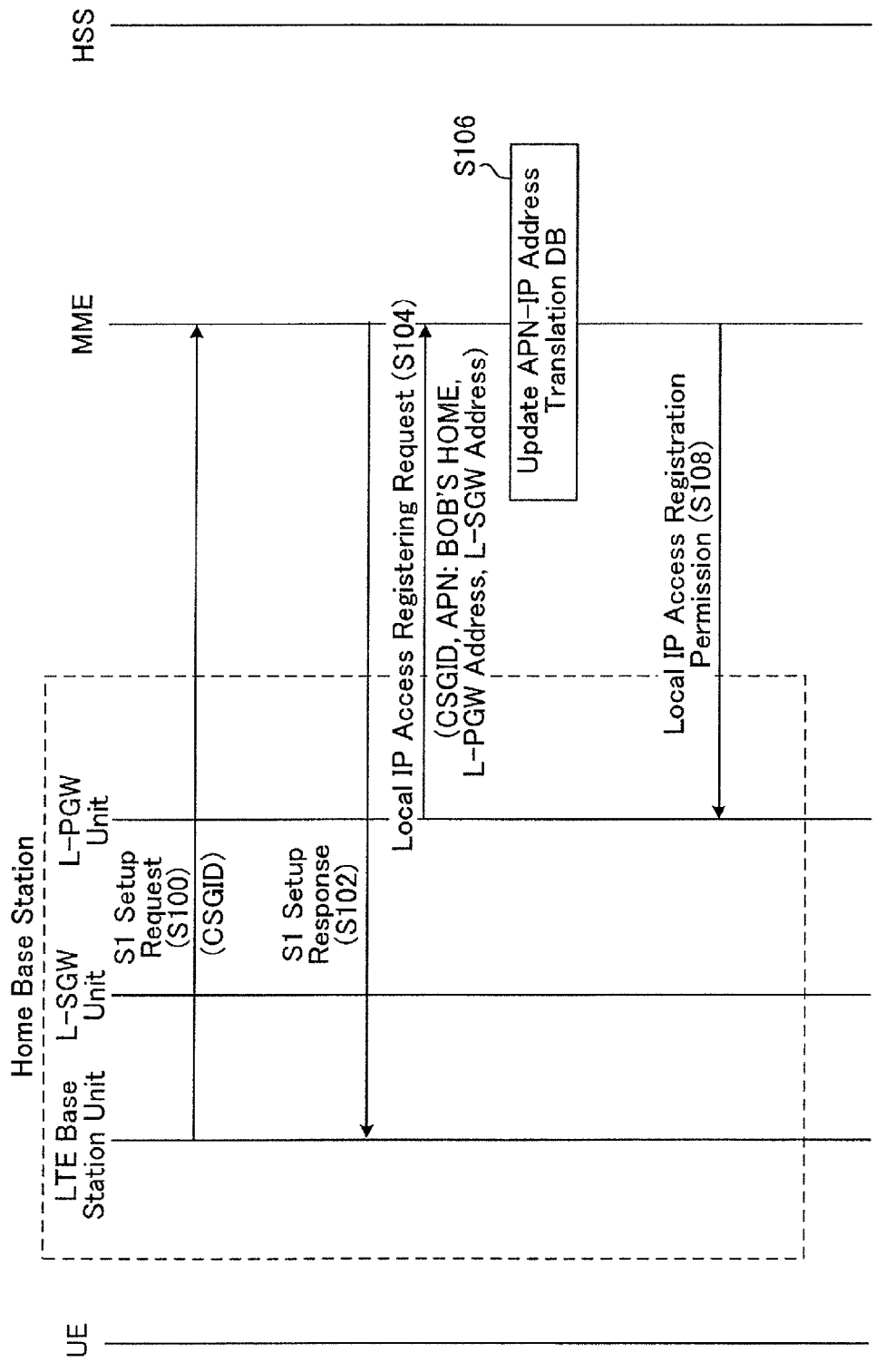
FIG. 18 is a diagram showing a sequence example of a registering process of a home base station in the first embodiment.

In the first embodiment and the second embodiment, the procedure of registering home base station 60 and home base station 62 to mobile communication system 1 was described by taking an example of a case where the home base station transmits a local IP access registering request to MME 40 as shown in FIG. 18 so as to request MME 40 to perform registration as a home base station that offers local IP access functionality.

Figure 30:
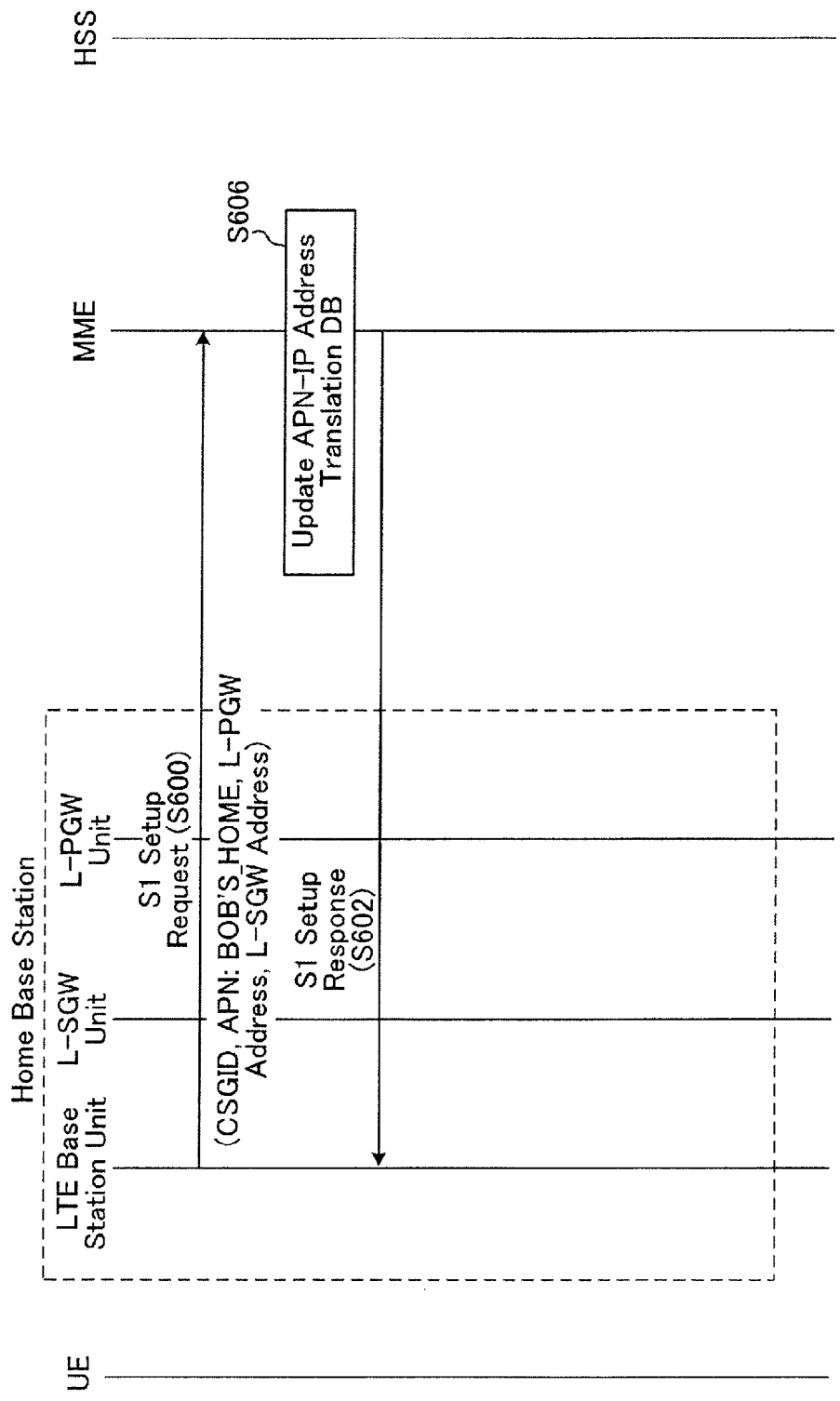
FIG. 30 is a diagram showing a variational sequence example of a registering process of a home base station.

However, not limited to this, it is possible to extend the S1 setup request so as to send the extended S1 setup request including not only CSGID but also a new APN for local IP access ("BOB'S_HOME"), the IP address of L-PGW unit 610 and the IP address of L-SGW unit 620 (S600), as shown in FIG. 30, to thereby update APN-IP address translation DB454 (S606). In this case, after updating APN-IP address translation DB454, a S1 setup response is transmitted (S602).

As the embodiments of this invention have been detailed heretofore with reference to the drawings, the specific configuration should not be limited to the embodied modes. Designs and others that do not depart from the gist of this invention should also be included in the scope of claims.

DESCRIPTION OF REFERENCE NUMERALS

1 mobile communication system
10 PGW
100 controller
110 transmitting/receiving unit
120 packet transmitting/receiving unit
150 storage
152 binding information
160 PMIP processor
20 SGW
200 controller
210 transmitting/receiving unit
220 packet transmitting/receiving unit
250 storage
260 PMIP processor
270 bearer establishment processor
30 HSS
300 controller
310 transmitting/receiving unit
350 storage
352 subscription DB
40 MME
400 controller
410 transmitting/receiving unit
450 storage
452 subscription DB
454 APN-IP address translation DB
50 GW
500 controller
510 transmitting/receiving unit
520 packet transmitting/receiving unit
550 storage
60, 62 home base station
600 controller
610 L-PGW unit
612 banding information
620 L-SGW unit
630 LTE base station unit
635 external antenna
650, 658 storage
652 packet filtering information
654 IP address pool
656 access right information
660 home network interface unit
670 interface unit used for broadband access network
70 UE
700 controller
710 LTE interface unit 715 external antenna
720 packet transmitting/receiving unit
750 storage
752 APN list
770 bearer establishment processor
80 information terminal
800 controller
810 home network interface unit
850 storage

The invention claimed is:

1. User Equipment (UE) in a communication system, wherein
the communication system is configured to contain:
   the UE;
   a base station;
   a core network;
   a network with which the UE is communicatable via the base station without passing through the core network; and a foreign Packet Data Network (PDN), and
the communication system is configured to provide: a first connection service for directly connecting from the base station to the network; and a second connection service for connecting to the foreign PDN without passing through the core network, wherein
the UE is configured to store a first Access Point Name (APN) in correspondence with allowance information indicating that the first connection service is allowed and the second connection service is disallowed,
the UE is configured to transmit a PDN Connectivity Request message containing the first APN to the core network, in order to request an establishment of a PDN connection,
the UE is configured to receive a response with respect to the PDN Connectivity Request message containing the first APN and establish a first PDN connection with an access control apparatus contained in the base station, and
the UE is configured to transmit data to and receive data from the network, through the first PDN connection.

2. The UE according to claim 1, wherein
the UE is configured to store a second APN in correspondence with allowance information indicating that the first connection service is disallowed and the second connection service is allowed,
the UE is configured to transmit a PDN Connectivity Request message containing the second APN to the core network, in order to request an establishment of a PDN connection,
the UE is configured to receive a response with respect to the PDN Connectivity Request message containing the second APN and establish a second PDN connection with the access control apparatus contained in the base station, and
the UE is configured to transmit communication data to and receive communication data from the foreign PDN, by selecting the second PDN connection.

3. The UE according to claim 1, wherein the foreign PDN is an Internet.

4. A position management apparatus with in a core network in a communication system, wherein
the communication system is configured to contain:
   a User Equipment (UE);
   a base station;
   the core network;
   a network with which the UE is communicatable via the base station without passing through the core network; and
   a foreign Packet Data Network (PDN), and
the communication system is configured to provide: a first connection service for directly connecting from the base station to the network; and a second connection service for connecting to the foreign PDN without passing through the core network, wherein
the position management apparatus is configured to store a first Access Point Name (APN) in correspondence with allowance information indicating that the first connection service is allowed and the second connection service is disallowed,
the position management apparatus is configured to receive a PDN Connectivity Request message containing an APN transmitted from the UE,
the position management apparatus is configured to allow to establish a first PDN connection for the first connection service between the UE and an access control apparatus contained in the base station in a case that the APN transmitted from the UE and the first APN is identical,
the position management apparatus is configured to transmit a bearer establishment request message containing the first APN to the UE, the bearer establishment request message being a response to the PDN Connectivity Request message containing the first APN.

5. The position management apparatus according to claim 4, wherein
the position management apparatus is configured to store a second APN in correspondence with allowance information indicating that the first connection service is disallowed and the second connection service is allowed,
the position management apparatus is configured to receive a PDN Connectivity Request message containing the APN transmitted from the UE,
the position management apparatus is configured to allow to establish a second PDN connection for the second connection service between the UE and the access control apparatus contained in the base station, and
the position management apparatus is configured to transmit a bearer establishment request message containing the second APN to the UE, the bearer establishment request message being a response to the PDN Connectivity Request message containing the second APN.

6. The position management apparatus according to claim 4, wherein the foreign PDN is an Internet.

7. A base station in a communication system, wherein
the communication system is configured to contain:
   a User Equipment (UE);
   the base station;
   a core network;
   a network with which the UE is communicatable via the base station without passing through the core network; and
   a foreign Packet Data Network (PDN), and
the communication system is configured to provide: a first connection service for directly connecting from the base station to the network; and a second connection service for connecting to the foreign PDN without passing through the core network, wherein
the base station is configured to receive a bearer establishment request message containing a first Access Point Name (APN) in correspondence with allowance information indicating that the first connection service is allowed and the second connection service is disallowed from a position management apparatus within the core network, the bearer establishment request message being a response to a PDN Connectivity Request message transmitted from the UE, the base station is configured to establish a first PDN connection for the first connection service with the UE.

8. A base station in a communication system, wherein the communication system is configured to contain:
   a User Equipment (UE);
   the base station;
   a core network;
   a network with which the UE is communicatable via the base station without passing through the core network; and
   a foreign Packet Data Network (PDN), and
the communication system is configured to provide: a first connection service for directly connecting from the base station to the network; and a second connection service for connecting to the foreign PDN without passing through the core network, wherein the base station is configured to receive a bearer establishment request message containing a second Access Point Name (APN) in correspondence with allowance information indicating that the first connection service is disallowed and the second connection service is allowed from a position management apparatus within the core network, the bearer establishment request message being a response to a PDN Connectivity Request message transmitted from the UE, the base station is configured to establish a second PDN connection for the second connection service with the UE.

9. The base station according to claim 7, wherein the foreign PDN is an Internet.

10. The base station according to claim 8, wherein the foreign PDN is an Internet.

* * * * *